US009229547B2

United States Patent
Kinoshita et al.

(10) Patent No.: US 9,229,547 B2
(45) Date of Patent: Jan. 5, 2016

(54) EXPANDABLE ELECTRONIC STYLUS

(71) Applicant: LENOVO (SINGAPORE) PTE. LTD., Singapore (SG)

(72) Inventors: Hiroaki Kinoshita, Kanagawa-ken (JP); Hiroyuki Noguchi, Yokohama (JP); Gang Ji, Sagamihara (JP); Eiji Shinohara, Kawasaki (JP)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 116 days.

(21) Appl. No.: 14/035,253

(22) Filed: Sep. 24, 2013

(65) Prior Publication Data
US 2015/0084933 A1  Mar. 26, 2015

(51) Int. Cl.
*G06F 3/033* (2013.01)
*G06F 3/038* (2013.01)

(52) U.S. Cl.
CPC .................... *G06F 3/0386* (2013.01)

(58) Field of Classification Search
CPC .................................................. G06F 3/0386
USPC ......... 345/156–184; 178/18.01–18.06; 70/58; 369/67
See application file for complete search history.

(56) References Cited

U.S. PATENT DOCUMENTS

| | | | | |
|---|---|---|---|---|
| 3,615,096 | A * | 10/1971 | Norris ...................... | G11B 3/08 369/181 |
| 6,568,511 | B1 * | 5/2003 | Day ............................. | 188/65.4 |
| 7,077,594 | B1 * | 7/2006 | Annerino et al. ............ | 401/258 |
| 2003/0055655 | A1 * | 3/2003 | Suominen ............... | G10L 15/22 704/276 |
| 2003/0101778 | A1 * | 6/2003 | Carl et al. ......................... | 70/58 |
| 2004/0196267 | A1 * | 10/2004 | Kawai et al. ................... | 345/173 |
| 2007/0139398 | A1 * | 6/2007 | Holman et al. ................ | 345/179 |
| 2008/0043001 | A1 * | 2/2008 | Perkins et al. ................. | 345/179 |
| 2009/0008163 | A1 * | 1/2009 | Chikazawa ........... | G06F 1/1616 178/19.01 |
| 2009/0231306 | A1 * | 9/2009 | Tseng .................... | B43K 25/00 345/179 |
| 2010/0188326 | A1 * | 7/2010 | Dines ........................... | 345/156 |
| 2011/0092254 | A1 * | 4/2011 | Bestle et al. .................. | 455/566 |
| 2011/0292003 | A1 * | 12/2011 | Liang ..................... | B43K 24/14 345/179 |
| 2011/0304577 | A1 * | 12/2011 | Brown ................ | G06F 3/03545 345/174 |
| 2012/0331546 | A1 * | 12/2012 | Falkenburg et al. ............ | 726/16 |
| 2014/0002397 | A1 * | 1/2014 | Bollineni ............ | G06F 3/03545 345/173 |
| 2014/0253469 | A1 * | 9/2014 | Hicks et al. .................... | 345/173 |
| 2014/0253470 | A1 * | 9/2014 | Havilio ......................... | 345/173 |
| 2015/0015523 | A1 * | 1/2015 | Boyd et al. .................... | 345/173 |

FOREIGN PATENT DOCUMENTS

JP   2007-128229 A   5/2007

* cited by examiner

*Primary Examiner* — Prabodh M Dharia
(74) *Attorney, Agent, or Firm* — Nutter McClennen & Fish LLP; John J. Penny, Jr.

(57) ABSTRACT

An extendable electronic stylus is described. The extendable electronic stylus has a distal end that provides an electronic input to an electronic device and a first cam with an elongated member that extends between a proximal end of the stylus and its distal end. The stylus also includes a second cam that rotates relative to the first cam when the proximal end of the stylus is pushed in a distal direction. The pushing of the proximal end of the stylus causes a surface of the second cam to contact the first cam surface. The stylus also includes a cover with a first look surface. The rotation of the second cam relative to the first cam cause a second lock surface of the second cam to abut the first lock surface, thereby locking the second cam in a fixed position relative to the first cam.

18 Claims, 24 Drawing Sheets

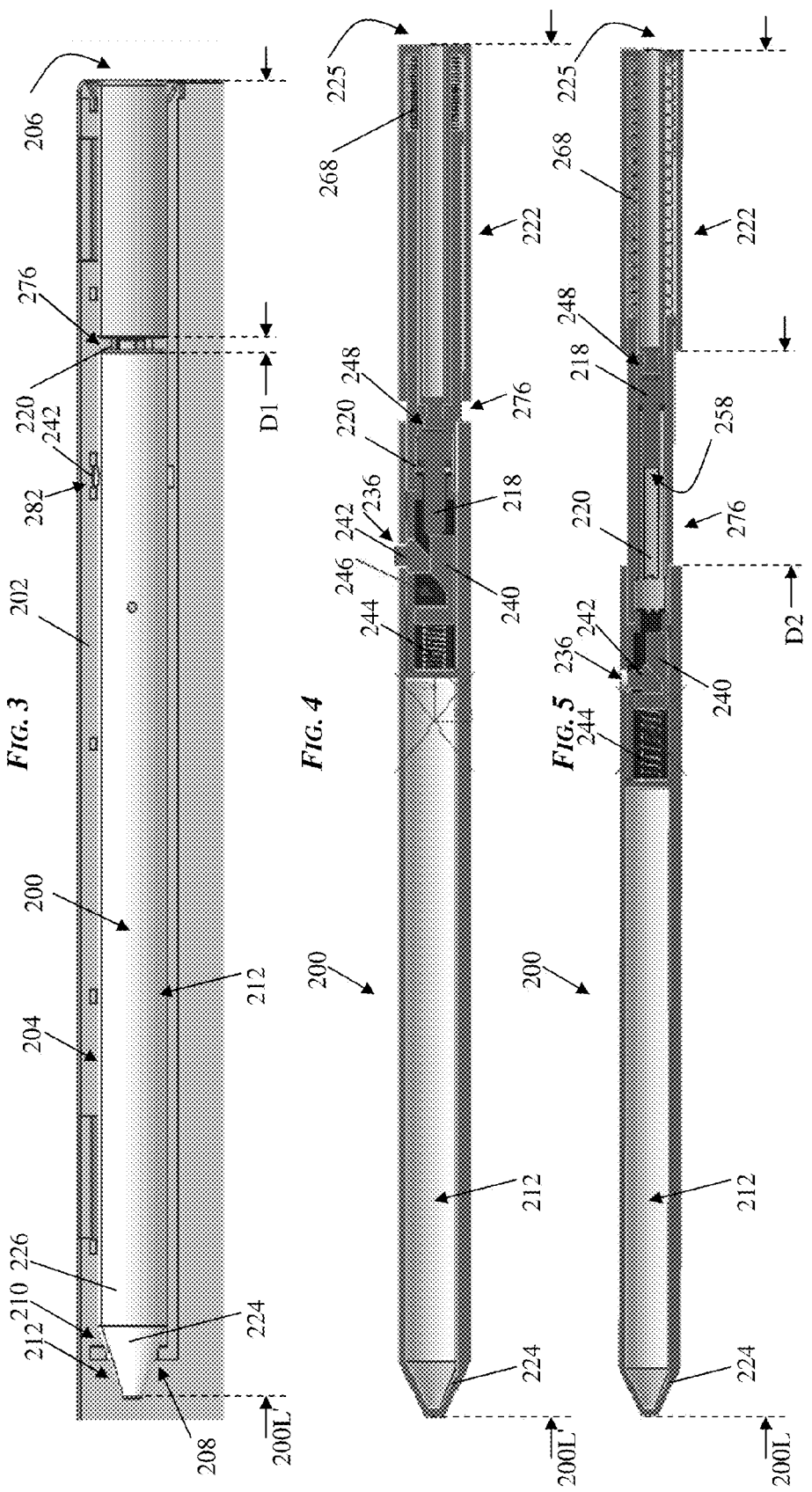

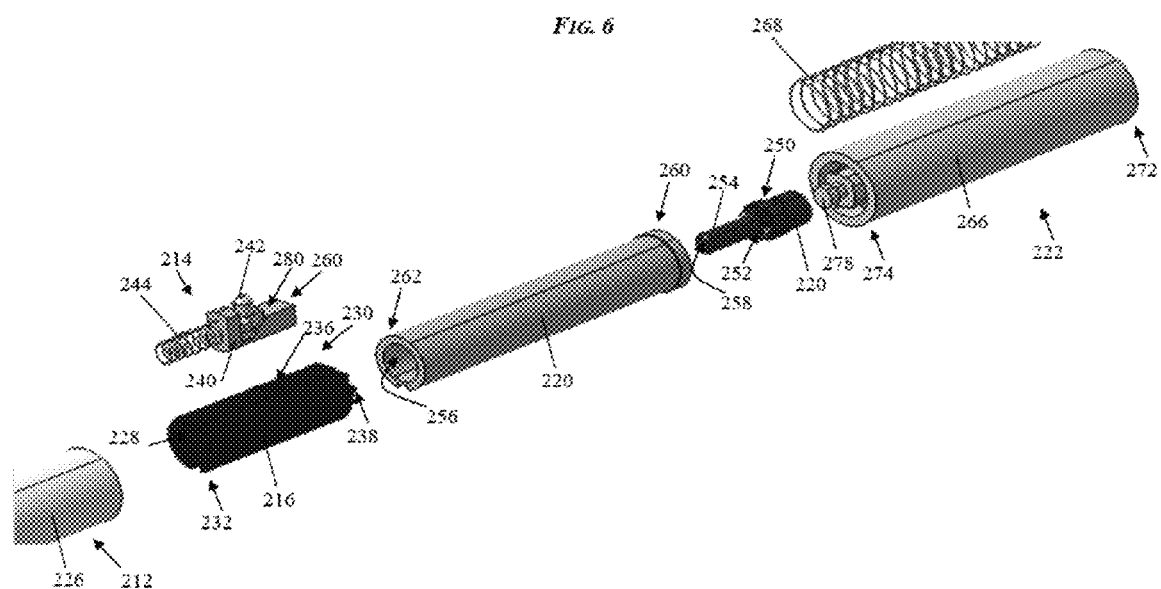

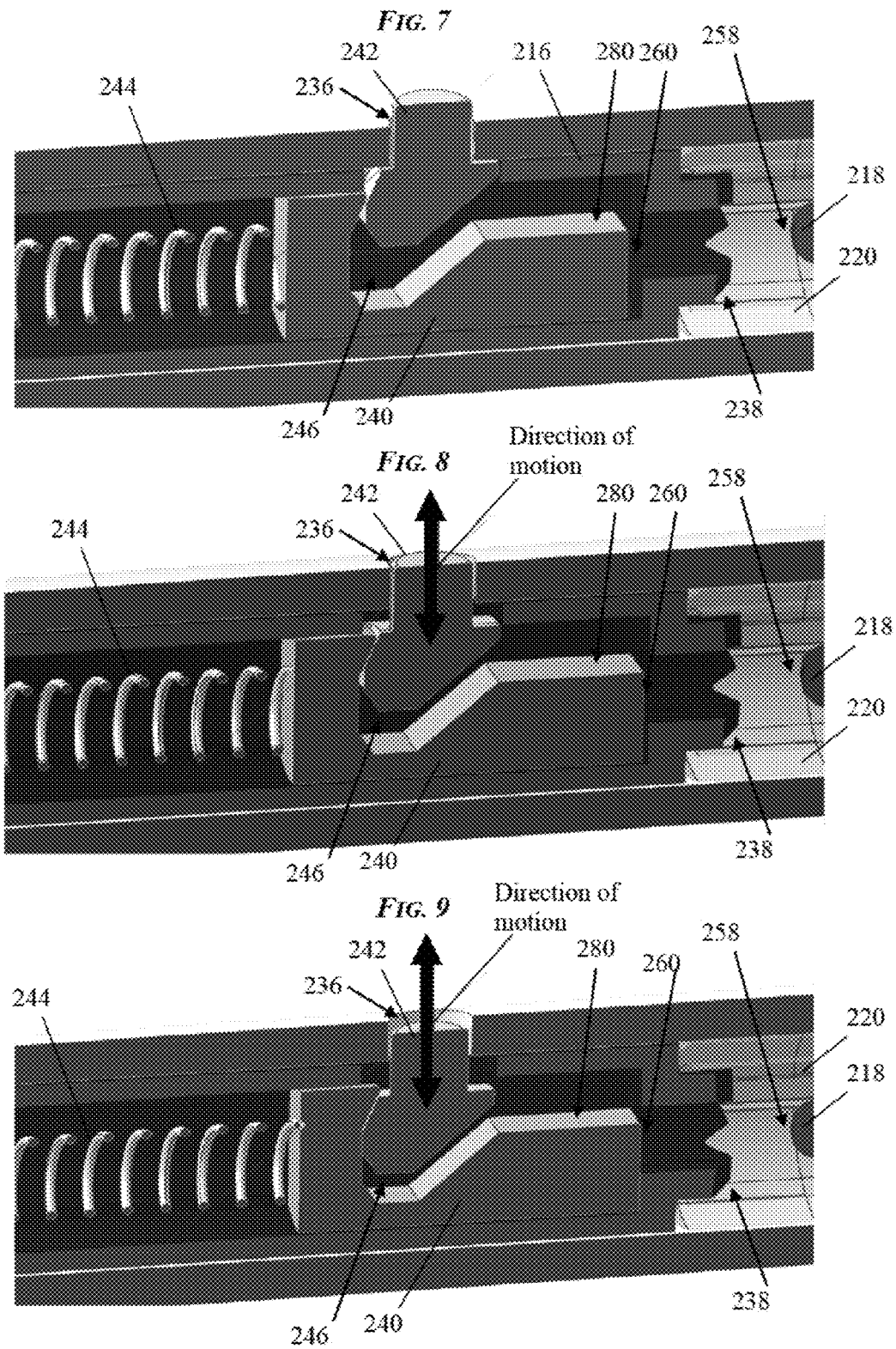

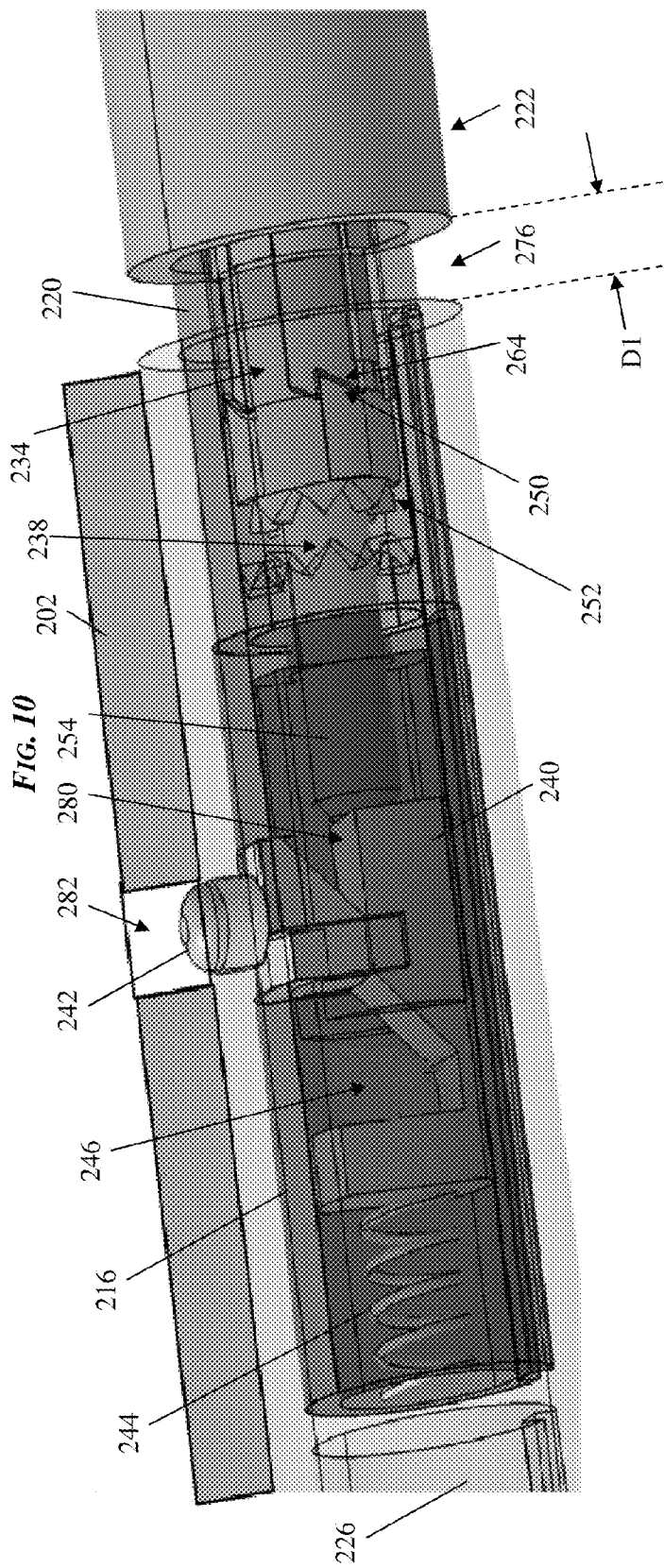

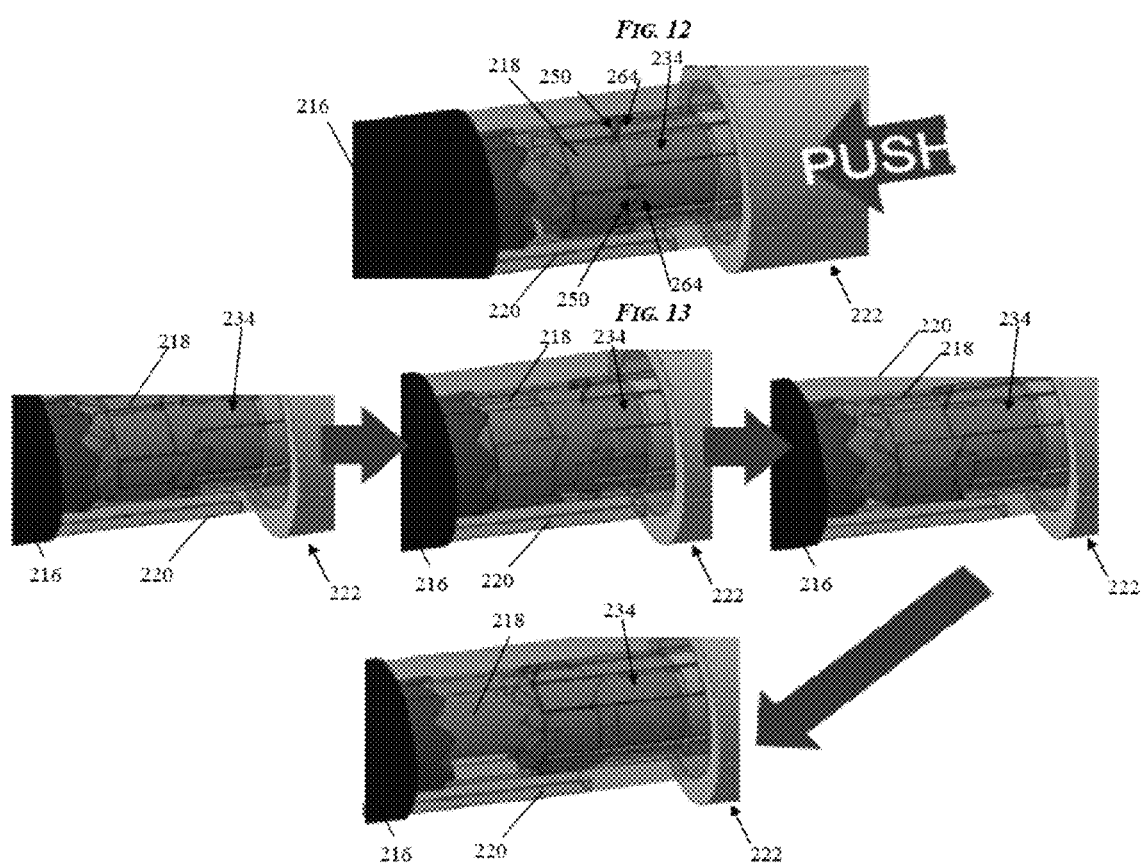

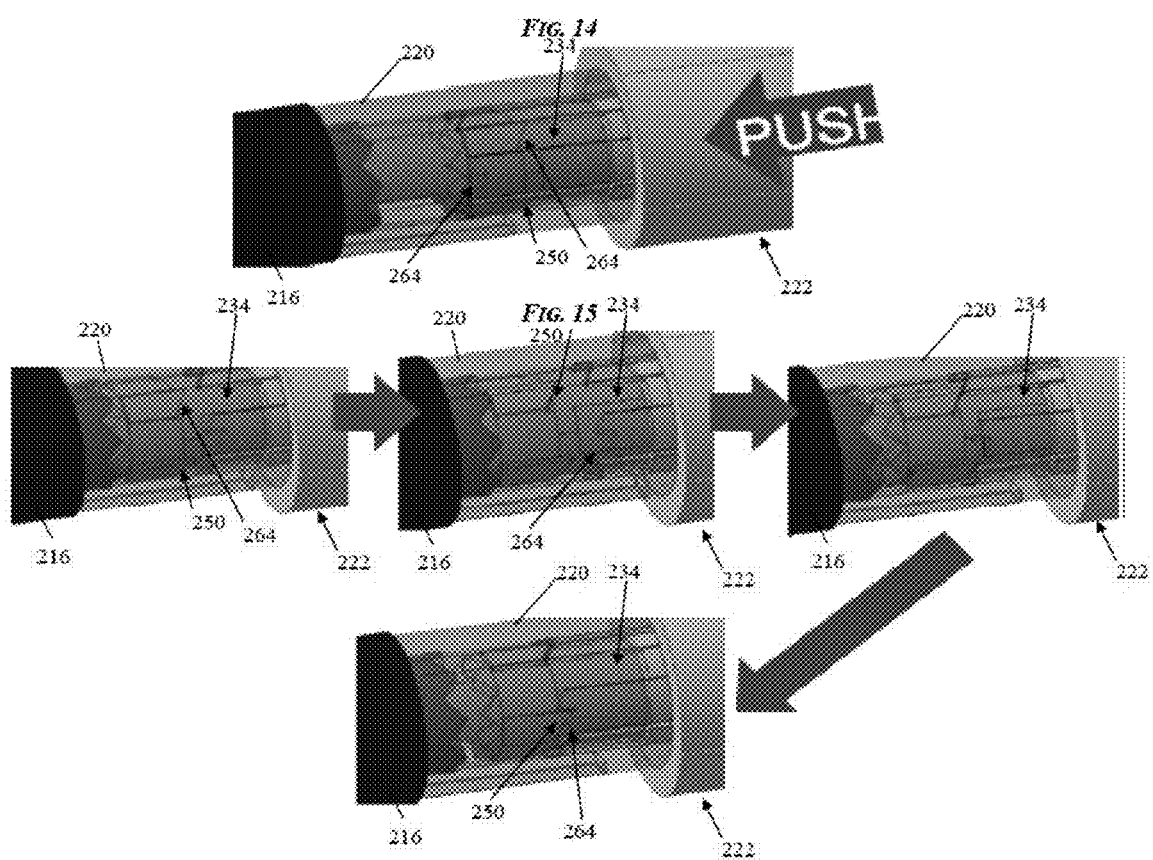

EXPANDABLE ELECTRONIC STYLUS

FIELD OF THE INVENTION

The present invention relates generally to electronic styluses, and more particularly to an expandable electronic stylus.

BACKGROUND OF THE INVENTION

Electronic devices such as tablet computers, slate computers, personal digital assistants, gaming consoles, and smart phones can permit users to provide input thereto using a digital pen, a digitizer pen, a stylus, a stylus pen, or the like, generally referred to herein as an "electronic stylus" or "stylus." For example, a stylus can be used to control a tablet computer as with a mouse, a joystick, or a keyboard, such as by manipulating icons on the tablet computer's screen, by moving windows on the screen, etc. Besides functioning as a basic selection tool, the stylus can allow writing (text, drawing, etc.) on the tablet computer's screen, such as to jot down notes and illustrations, which can be stored digitally.

An electronic stylus can facilitate use of an electronic device, but electronic styluses involve a number of potential hazards. Electronic styluses can be easily misplaced, as with ordinary writing implements such as pencils and ballpoint pens. Replacing misplaced electronic styluses is typically more costly than replacing ordinary writing implements and can result in interrupted use of an electronic device for hours, days, or more while a user obtains a replacement electronic stylus. Another potential hazard with electronic styluses is that they usually must be stored and transported with increased care and safety over non-electronic devices in order to avoid stylus damage, e.g., from being dropped, from being exposed to rain or other moisture, from being cracked or crushed by a heavier object, etc.

Many electronic devices do not include storage space for an electronic stylus. The stylus must therefore be otherwise stored and/or transported by a user, which can increase chances of stylus damage and/or increase chances of misplacing the stylus. Even if an electronic device does include storage space for an electronic stylus, the stylus occupies valuable device real estate, thereby preventing other aspects of the device from occupying that space. The electronic device may thus be limited in any one or more of its processing capabilities, battery power, memory size, audio output ability, etc., in order to provide storage space for the electronic stylus. Built-in storage space for an electronic stylus can additionally or alternatively increase an electronic device's size, which can make the electronic device less attractive to a user.

Accordingly, there remains a need for an improved electronic stylus.

SUMMARY OF THE INVENTION

In one embodiment, a device is provided includes an electronic stylus that includes a distal end configured to provide an electronic input to an electronic device, a first cam having a first cam surface, a second cam configured to rotate relative to the first cam when the stylus is pushed in a distal direction, and a cover having a first lock surface. The pushing of the stylus can cause a second cam surface of the second cam to contact the first cam surface and cause the rotation of the second cam relative to the first cam. The rotation of the second cam relative to the first cam can cause a second lock surface of the second cam to abut the first lock surface so as to lock the second cam in a fixed position relative to the first cam.

The device can vary in any number of ways. For example, pushing of the stylus in the distal direction can cause the stylus to reduce in total longitudinal length.

For another example, pushing the stylus in the distal direction when the second lock surface abuts the first lock surface can cause the second lock surface to move a distance apart from the first lock surface and can cause the second cam to rotate relative to the first cam. A total longitudinal length of the stylus can be larger when the second lock surface is the distance apart from the first lock surface than when the second lock surface abuts the first lock surface.

For yet another example, the first cam can have an opening formed through a sidewall thereof. The stylus can include a protrusion configured to move between a first position in which the protrusion is positioned within the opening and a second position in which the protrusion is not positioned within the opening. The pushing of the stylus can cause the protrusion to move from the second position to the first position. Pushing the stylus in the distal direction when the second lock surface abuts the first lock surface can cause the protrusion to move from the first position to the second position.

For still another example, the pushing of the stylus in the distal direction can cause the second cam to translate longitudinally within a passageway extending through the cover.

For another example, the distal end of the stylus can be configured to provide the electronic input by contacting at least one of a touch-sensitive surface of the electronic device and a light-sensitive surface of the electronic device.

In another aspect, a system is provided that in one embodiment includes the electronic device and the electronic stylus. The electronic device can have a cavity formed therein, and the electronic can be removably and replaceably disposed in the cavity.

The system can have any number of variations. For example, the stylus can be configured to move between an unlocked configuration in which the stylus can be removed from the cavity and a locked configuration in which the stylus is locked within the cavity. The second lock surface can abut the first lock surface when the stylus is in the locked configuration, and the second lock surface can be spaced a distance apart from the first lock surface when the stylus is in the unlocked configuration.

In another embodiment, a system includes a housing of an electronic device, and an electronic stylus removably and replaceably disposed in a cavity formed in the housing. The stylus can have a distal tip configured to provide an electronic input to the electronic device. The stylus can be movable between an unlocked configuration in which the stylus can be removed from the cavity and a locked configuration in which the stylus is locked within the cavity. The stylus in the cavity can be movable from the locked configuration to the unlocked configuration by pushing on the stylus relative to the housing in a distal direction, and the stylus in the cavity can be movable from the unlocked configuration to the locked configuration by pushing on the stylus relative to the housing in the distal direction.

The system can vary in any number of ways. For example, the stylus can have a first longitudinal length in the locked configuration and a second longitudinal length in the unlocked configuration that is greater than the first longitudinal length.

For another example, the housing can have a depression formed therein that is in communication with the cavity. The stylus can have a protrusion extending therefrom that is disposed in the depression when the stylus is in the locked configuration and that is not disposed in the depression when the stylus is in the unlocked configuration. Pushing on the stylus in the distal direction when the stylus is in the locked configuration can cause the protrusion to move out of the depression, and pushing on the stylus in the distal direction when the stylus is in the unlocked configuration can cause the protrusion to move into the depression.

For yet another example, when the stylus is in the locked configuration, a first portion of the stylus can be positioned entirely within the cavity. When the stylus is in the unlocked configuration, part of the first portion of the stylus can be positioned within the cavity and another part of first portion of the stylus can be positioned outside the cavity.

For still another example, the stylus can include a detent element that biases the stylus to the unlocked configuration. Pushing on the stylus in the distal direction when the stylus is in the unlocked configuration can counteract a bias provided by the detent element so as to move the stylus to the locked configuration.

For another example, the stylus can include a cam that rotates relative to the housing when the stylus is in the unlocked configuration and is pushed in the distal direction so as to abut the cam against a stop surface of the stylus and move the stylus to the locked configuration.

BRIEF DESCRIPTION OF THE DRAWINGS

The invention will be more fully understood from the following detailed description taken in conjunction with the accompanying drawings, in which:

FIG. 3 is a side view of another embodiment of an electronic stylus in an unexpanded configuration disposed in a cavity of another embodiment of an electronic device;

FIG. 4 is a partial cross-sectional side view of the stylus of FIG. 3;

FIG. 5 is a partial cross-sectional side view of the stylus of FIG. 3 in an expanded configuration;

FIG. 6 is a partial, exploded view of the stylus of FIG. 3;

FIG. 7 is a partial cross-sectional perspective view of the stylus of FIG. 3 in an intermediate configuration subsequent to the unexpanded configuration of FIG. 3;

FIG. 8 is a partial cross-sectional perspective view of the stylus of FIG. 7 in an intermediate configuration subsequent to the intermediate configuration of FIG. 7;

FIG. 9 is a partial cross-sectional perspective view of the stylus of FIG. 3 in yet another intermediate configuration subsequent to the other intermediate configuration of FIG. 8;

FIG. 10 is a partial transparent perspective view of the stylus of FIG. 3;

FIG. 12 is another partial transparent perspective view of the stylus of FIG. 3;

FIG. 13 is a partial transparent perspective view of the stylus in a plurality of sequential intermediate configurations subsequent to the unexpanded configuration of FIG. 12;

FIG. 14 is another partial transparent perspective view of the stylus of FIG. 5;

FIG. 15 is a partial transparent perspective view of the stylus in a plurality of sequential intermediate configurations subsequent to the expanded configuration of FIG. 14;

DETAILED DESCRIPTION OF THE INVENTION

Figure 1:
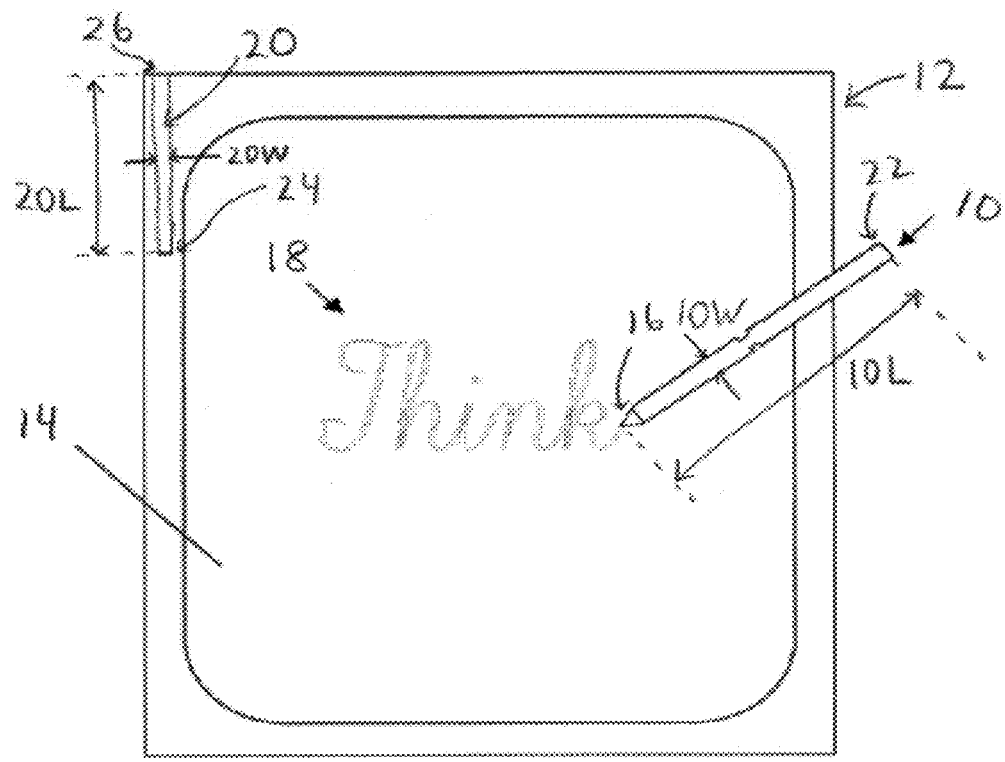
FIG. 1 is a schematic view of one embodiment of an electronic device and one embodiment of an electronic stylus.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In the present disclosure, like-named components of the embodiments generally have similar features, and thus within a particular embodiment each feature of each like-named component is not necessarily fully elaborated upon. Sizes and shapes of devices and components of electronic devices discussed herein can depend at least on the electronic devices in which the devices and components will be used.

Various exemplary expandable electronic styluses are provided. In general, an expandable electronic stylus can be configured to provide an electronic input to an electronic device and can be configured to be removably and replaceably disposed in the electronic device. The stylus can thus be easily stored with the electronic device when not in use, thereby helping to prevent the stylus from being lost and allowing the stylus to be immediately and easily retrieved by a user for use with the electronic device. The stylus can be protected from jostling, crushing, and/or other potential damage by being disposable within the electronic device when not being used by a user. The stylus can thus be less likely to need replacement and/or repair due to damage caused when the stylus is not being used and/or is being transported. As electronic devices are increasingly becoming mobile and frequently transported by users, protecting styluses and prolonging their useful life is gaining increased importance.

In an exemplary embodiment, an expandable electronic stylus can be configured to be movable between a first configuration in which the stylus has a first longitudinal length and a second configuration in which the stylus has a second longitudinal length that is greater than the first longitudinal length. The stylus can be configured to be stored in an electronic device in the first configuration, which can allow the stylus to occupy a minimal amount of real estate within the electronic device, thereby freeing space for other components (e.g., memory, speakers, lights, power sources, processors, etc.) and/or allowing the electronic device to be smaller and hence more easily transportable and/or attractive to a user. The stylus in the second, larger configuration can be configured to be used by a user, which can make the stylus easier to handle by hand, while allowing the stylus to be reduced in size for storage. The stylus can include a movement mechanism configured to move the stylus between the first and second configurations. The movement mechanism can be self-contained within the stylus, which can allow the stylus to be more easily incorporated into existing electronic device designs and/or can ease repair and/or replacement of damaged styluses because only the stylus, not the typically much more expensive and complicated electronic device, need be repaired and/or replaced. The movement mechanism can be entirely mechanical, e.g., not include electrical components, which can allow the stylus to move between the first and second configurations without requiring any power source and/or can facilitate manufacture of the stylus by using mechanical components for the movement mechanism instead of typically more expensive electrical components.

A person skilled in the art will appreciate that the expandable electronic styluses disclosed herein can be configured for use with an electronic device and that the styluses can be configured to provide electronic input thereto, such as by contacting (e.g., writing on, tapping on, drawing on, etc.) an input surface coupled to the electronic device and configured to receive an input, such as touch and/or light, from the stylus. As will be appreciated by a person skilled in the art, the input surface can be fixedly mounted in the same chassis or package as the electronic device, as well as removably and replaceably connected, wired or wirelessly, to the same chassis or package as the electronic device. The term "electronic device" as used herein refers to any of a variety of digital data processing devices, e.g., laptop or notebook computers, tablet computers, slate computers, server computers, graphics tablets, interactive whiteboards, mobile phones, personal digital assistants (PDAs), gaming systems, televisions, radios, portable music players, and the like. The term "display" as used herein refers to any of a variety of display devices, e.g., a liquid crystal display (LCD), a light-emitting diode (LED) screen, a cathode ray tube (CRT) screen, a touchscreen, a 3D screen, and the like. Additionally, the term "display" as used herein can refer to a display that is fixedly mounted in the same chassis or package as a base of an electronic device, as well as to displays that are removably and replaceably connected, wired or wirelessly, to the same chassis or package as a base of an electronic device.

FIG. 1 illustrates one embodiment of an electronic stylus 10 configured to provide an electronic input to an electronic device 12. The stylus 10 can generally include an elongate member configured to be manipulated by a user similar to a pencil, ballpoint pen, marker, paintbrush, or other ordinary writing or drawing instrument. The electronic device 12 is shown as a tablet computer in the illustrated embodiment, but the stylus 10 can be configured to be used with any type of electronic device. The electronic device 12 includes an input surface 14 configured to receive an input from the stylus 10, such as a touch input on the input surface 14 and/or a light input to the input surface 14. A distal end 16 of the stylus 10 can be configured to provide the input to the input surface 14, similar to writing on paper or other surface with a pen, pencil, chalk, etc. The input to the input surface 14 can cause an input display 18 to appear on the input surface 14. The input display 18 includes writing in the illustrated embodiment, but as will be appreciated by a person skilled in the art, the stylus 10 can be configured to additionally or alternatively cause other input displays, such as drawings, window movement, etc. In other embodiments, a stylus's input to an input surface can cause an input display to appear on an electronic device's display, which may or may not be the input surface. For example, the stylus can be configured to provide an input to an input surface of a graphics tablet, and the input can cause an input display to be shown on a display coupled to the graphics tablet.

Referring again to FIG. 1, the electronic device 12 can include a cavity 20 formed therein. The cavity 20 can be configured to seat the stylus 10 therein. The electronic device 12 can thus be configured to store the stylus 10 therein when the stylus 10 is not in user by a user. The cavity 20 can have a maximum longitudinal length 20L less than a maximum longitudinal length 10L of the stylus 10. The cavity 20 can be configured to have the stylus 10 disposed entirely therein despite having a smaller maximum longitudinal length 20L than the stylus 10 because the stylus 10 can be configured to be movable between expanded and unexpanded configurations.

When the stylus 10 is in the expanded configuration, shown in FIG. 1, the stylus 10 can have a total longitudinal length equal to the stylus's maximum longitudinal length 10L. When the stylus 10 is in the unexpanded configuration (not shown), the total longitudinal length of the stylus 10 can be less than the stylus's longitudinal length 10L in the expanded configuration. The stylus 10 can thus be configured to be disposed entirely within the cavity 20 when the stylus 10 is in the unexpanded configuration since the stylus 10 has a smaller longitudinal length than when the stylus 10 is in the expanded configuration. The cavity's longitudinal length 20L can be equal to the stylus's longitudinal length when the stylus 10 is in the unexpanded configuration, which can allow the stylus 10 to be disposed entirely within the cavity 20 and facilitate user access to a proximal end 22 of the stylus 10 when the stylus 10 is disposed in the cavity 20 in the unexpanded configuration with the stylus 10 disposed distally in the cavity 20, e.g., with the distal end 16 of the stylus 10 advanced toward a closed distal end 24 of the cavity 20. The closed end 24 can facilitate expansion and collapsing of the stylus 10 by providing a stop surface for the stylus's distal end 16 to abut against, as discussed further below. A proximal end 26 of the cavity 20 opposite the closed end 24 and adjacent a perimeter of the electronic device 12 can be open, as shown in the illustrated embodiment. The proximal end 26 can be configured to be selectively open, such as by the electronic device 12 including a lid (not shown) for the cavity 20, such as a retractable cover, a slidable cover, a hinged lid, etc., that allows the proximal end 26 to be open or closed. Having the proximal end 26 be selectively open can allow a user to access the stylus 10 therein when the lid is open while helping to protect the stylus 10 therein when the lid is closed.

The cavity 20 can have a maximum width 20W greater than a maximum width 10W of the stylus 10, thereby facilitating receipt of the entire stylus 10 therein. The cavity 20 is shown as having a constant width 20W along the longitudinal length 20L thereof, but the cavity 20 can have a varying width.

The stylus 10 can include a movement mechanism (not shown) configured to move the stylus 10 between the expanded and unexpanded configurations. The stylus 10 can include the entire movement mechanism. In other words, the movement mechanism can be self-contained within the stylus 10 such that electronic device 12 can does not include any part of the movement mechanism. The movement mechanism can be entirely mechanical, though the stylus 10 can include any number of electrical components that do not expand/unexpand the stylus 10, such as electrical component(s) related to providing the input to the input surface 14.

The movement mechanism can be configured to be manually actuated by a user when the stylus 10 is disposed in the cavity 20 to move the stylus 10 between the expanded and unexpanded configurations. The movement mechanism can be configured to be actuated by pushing distally on the proximal end 22 of the stylus 10 when the stylus 10 is disposed in the cavity 20. When the stylus's proximal end 22 is pushed in a distal direction when the stylus 10 is in the cavity 20 in the unexpanded configuration, the movement mechanism can cause the stylus 10 to move from the unexpanded configuration to the expanded configuration so as to increase the total longitudinal length of the stylus 10. When the stylus's proximal end 22 is pushed in a distal direction when the stylus 10 is in the cavity 20 in the expanded configuration, the movement mechanism can cause the stylus 10 to move from the expanded configuration to the unexpanded configuration so as to decrease the total longitudinal length of the stylus 10. A proximal portion of the stylus 10 can thus be configured to be disposed in the cavity 20 when the stylus 10 is in the cavity 20 in the unexpanded configuration and to be positioned outside the cavity 20 when the stylus 10 is in the cavity 20 in the expanded configuration. The stylus's proximal portion being positioned outside the cavity 20 when the stylus 10 is in the expanded configuration can facilitate user removal of the stylus 10 from the cavity 20. The proximal portion of the stylus 10 can include the stylus's proximal end 22 when the cavity's longitudinal length 20L is equal to or greater than the stylus's longitudinal length when the stylus 10 is in the unexpanded configuration. If the cavity's longitudinal length 20L is less than the stylus's longitudinal length when the stylus 10 is in the unexpanded configuration, the stylus's proximal end 22 can always be positioned outside the cavity 20 regardless of whether the stylus 10 is in the cavity 20 in the expanded or unexpanded configuration. The proximal end 22 being positioned outside the cavity 20 can facilitate access to the stylus's proximal end 22 for pushing thereof.

An electronic device such as the electronic device 10 of FIG. 1 can include and/or be in communication with any of a variety of software and/or hardware components. In addition, although an exemplary electronic device is depicted and described herein, a person skilled in the art will appreciate that this is for sake of generality and convenience. In other embodiments, the electronic device may differ in architecture and operation from that shown and described with respect to any of the illustrated embodiments.

Figure 2:
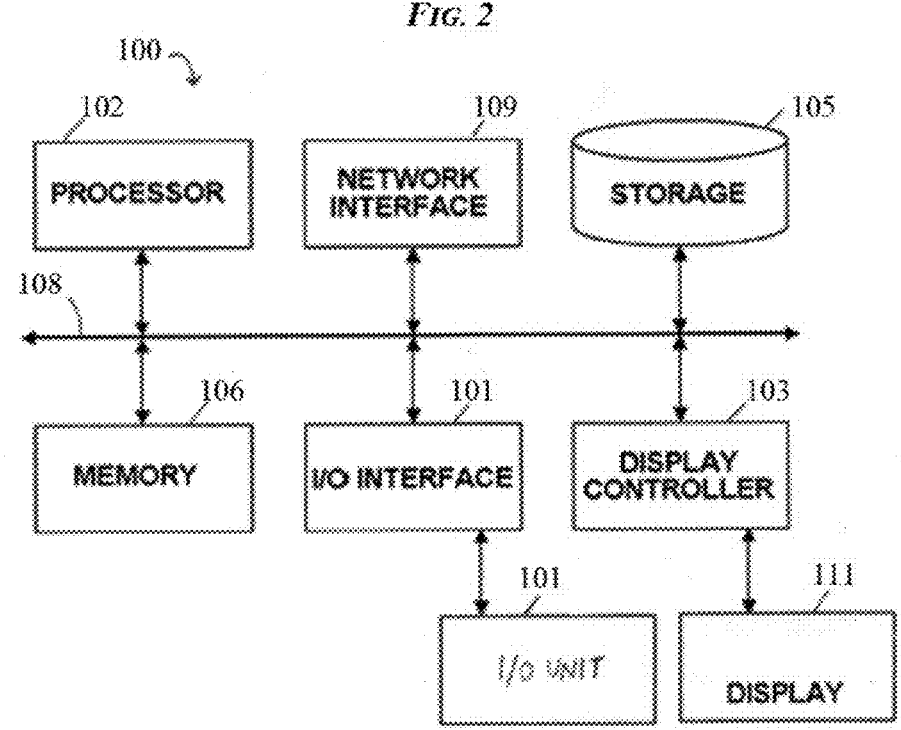
FIG. 2 is a block diagram representation of a computing system of the electronic device of FIG. 1.

As shown in FIG. 2, an electronic device 100 can include a processor 102 which controls the operation of the device 100, for example by executing an operating system (OS), a basic input/output system (BIOS), device drivers, application programs, and so forth. The processor 102 can include any type of microprocessor or central processing unit (CPU), including programmable general-purpose or special-purpose microprocessors and/or any one of a variety of proprietary or commercially-available single or multi-processor systems. The device 100 also includes a memory 106, which can provide temporary storage for code to be executed by the processor 102 or for data that is processed by the processor 102. The memory 106 can include read-only memory (ROM), flash memory, one or more varieties of random access memory (RAM), and/or a combination of memory technologies. The various elements of the device 100 can be coupled to a bus system 108. The illustrated bus system 108 is an abstraction that a person skilled in the art will appreciate represents any one or more separate physical busses, communication lines/interfaces, and/or multi-drop or point-to-point connections, connected by appropriate bridges, adapters, and/or controllers.

The device 100 can also include a network interface 109, an input/output (I/O) interface 107, a storage device 105, and a display controller 103. The network interface 109 can enable the device 100 to communicate with remote devices, e.g., other electronic devices, over a network. The I/O interface 107 can facilitate communication between one or more I/O units 101, e.g., an electronic stylus. A person skilled in the art will appreciate that the device 100 can be configured to communicate with a variety of I/O units 101. Examples of input units include an electronic stylus, a keyboard, a mouse, a joystick, and a pointing device. Examples of output units includes a speaker, a printer, a scanner, a removable memory, and the various other components of the device 100. The storage device 105 can include any conventional medium for storing data in a non-volatile and/or non-transient manner. The storage device 105 can thus hold data and/or instructions in a persistent state, i.e., the value is retained despite interruption of power to the device 100. The storage device 105 can include one or more hard disk drives, flash drives, universal serial bus (USB) drives, optical drives, various media disks or cards, and/or any combination thereof, and can be directly connected to the other components of the device 100 or remotely connected thereto, such as over a network. The display controller 103 can include a video processor and a video memory, and can generate images to be displayed on a display 111 in accordance with instructions received from the processor 102.

One or more software modules can be executed by the device 100 to facilitate human interaction with the device 100. These software modules can be part of a single program or one or more separate programs, and can be implemented in a variety of contexts, e.g., as part of an operating system, a device driver, a standalone application, and/or combinations thereof. A person skilled in the art will appreciate that any software functions being performed by a particular software module can also be performed by any other module or combination of modules.

FIGS. 3-5 illustrate another embodiment of an electronic stylus 200 configured to provide an electronic input to an electronic device 202. The electronic device 202, shown in FIG. 3, can include a cavity 204 formed therein that can be configured to seat the stylus 200 therein. The stylus 200 can generally include an elongate member configured to be manipulated by a user similar to a pencil, ballpoint pen, marker, paintbrush, or other ordinary writing or drawing instrument. The stylus 200 can be configured to be moveable in the cavity 204 between an unexpanded configuration, shown in FIGS. 3 and 4, and an expanded configuration, shown in FIG. 5.

The stylus's longitudinal length can be adjustable between a maximum longitudinal length 200L, shown in FIG. 5, and another, smaller longitudinal length 200L', shown in FIGS. 3 and 4, by actuating a movement mechanism of the stylus 200, as discussed further below. The cavity 204 can, as shown in FIG. 3, be configured to have the stylus 200 disposed entirely therein such that the electronic device 202 can fully contain the stylus 200 therein at least when the stylus 200 is in an unexpanded configuration when the stylus 200 has the smaller longitudinal length 200L'. The stylus's maximum longitudinal length 200L can be any percentage larger than the stylus's smaller longitudinal length 200L', such as at least 5% larger, at least 10% larger, at least 15% larger, between 5% and 10% larger, etc. In one embodiment, the stylus's maximum longitudinal length 200L can be 115 mm, and the smaller longitudinal length 200L' can be 105 mm.

When the stylus 200 is in the cavity 204 in the unexpanded configuration, the stylus 200 can be locked within the cavity 204 so as to be non-removable therefrom until a user actuates the stylus 200, as discussed further below, to move the stylus 200 from the unexpanded configuration to the expanded configuration. When the stylus 200 is in the cavity 204 in the expanded configuration, the stylus 200 can be configured to be removed from within the cavity 204 by a user, e.g., by grasping a proximal portion of the stylus's longitudinal length extending proximally out of the cavity 204 and pulling the stylus 200 in a proximal direction. The stylus 200 can thus be configured to be stored in the electronic device 202, e.g., within the device's cavity 204, when the stylus 200 is not in use and to be easily accessible when a user desires to use the stylus 200.

The cavity 204 can have opposed open proximal and distal ends 206, 208, as in the illustrated embodiment. The cavity 204 can include a stop surface 210 adjacent the open distal end 208. The stop surface 210 can be configured to abut the stylus's distal end 212 and thereby facilitate expansion and collapsing of the stylus 200, as discussed further below. The cavity's proximal end 206 can be configured to be selectively open. The cavity 204 can have a maximum width 204W greater than a maximum width 200W of the stylus 200, thereby facilitating receipt of the entire stylus 200 therein.

As shown in FIGS. 4-6, the stylus 200 can include a hardware assembly 212, a lock assembly 214, a first cam 216, a second cam 218, a cover 220, and a slider assembly 222. The stylus 200 can include a housing (not shown) configured to house therein the hardware assembly 212, the lock assembly 214, the first cam 216, the second cam 218, the cover 220, and the slider assembly 222. The housing can be configured to help protect the components housed therein from being inadvertently damaged.

The hardware assembly 212 can include a working distal tip 224 of the stylus 200, hardware (not shown) configured to receive and/or transmit signals to and/or from the electronic device 202, and an outer housing 226 configured to house the hardware. The hardware can have a variety of configurations, as will be appreciated by a person skilled in the art, and can include various components configured to facilitate interaction of the stylus 200 and the electronic device 202, e.g., using touch signals, light signals, etc. The outer housing 226 has a cylindrical shape and the distal tip 224 has a conical shape in the illustrated embodiment, but the outer housing 226 and the distal tip 224 can have other shapes.

The movement mechanism of the stylus 200 can include the lock assembly 214, the first cam 216, the second cam 218, the cover 220, and the slider assembly 222. The stylus 200 can thus include the entire movement mechanism such that the movement mechanism can be self-contained within the stylus 200 such that electronic device 202 can does not include any part of the movement mechanism. In general, the movement mechanism can be configured to be manually actuated by a user by pushing on the stylus's proximal end 225 in a distal direction when the stylus 200 is disposed in the cavity 204 so as to move the stylus 200 between the expanded and unexpanded configurations. The movement mechanism can be entirely mechanical, as in the illustrated embodiment, though the stylus 200 can include any number of electrical components as part of the hardware assembly 212 and/or as part of another aspect of the stylus 200 that does not cause expansion/collapsing of the stylus 200, such as a warning light (not shown) configured to illuminate when the stylus 200 is at least partially disposed within the cavity 204 but has not been locked into position in the cavity 204.

The first cam 216 can have a variety of sizes, shapes, and configurations. The first cam 216 can include an elongate member having an inner lumen 228 extending between proximal and distal ends 230, 232 thereof. The elongate member can be cylindrical, as in the illustrated embodiment.

The first cam 216 can have an opening, window, or hole 236, generally referred to herein as an "opening," formed through a sidewall thereof. The opening 236 can be configured to receive the lock assembly 214 therein so as to facilitate movement of the stylus 200 between the expanded and unexpanded configurations, as discussed further below.

The proximal end 230 of the first cam 216 can include a proximal cam surface 238, e.g., a cam surface that faces proximally. The cam surface 238 can be configured to abut the second cam 218 so as to facilitate rotation of the second cam 218 relative thereto, as discussed further below. The cam surface 238 can include at least one angled surface, which can help stably and controllably rotate the second cam 218 relative to the first cam 216. As in the illustrated embodiment, the at least one angled surface 238 can include a plurality of angled surfaces 238. The plurality of angled surfaces 238 can include a sawtooth pattern, as in the illustrated embodiment, in which a plurality of saw teeth are arranged radially around the proximal end 230 of the first cam 216.

The lock assembly 214 can have a variety of sizes, shapes, and configurations. The lock assembly 214 can include a base 240; a protrusion, pin, or button 242, generally referred to herein as a "protrusion," movably coupled to the base 240; and a detent element 244 movably coupled to the base 240.

The base 240 can include a member having a depression, dent, or seat 246, generally referred to herein as a "depression," configured to movably seat the protrusion 242 therein. An angled surface of the base 240 adjacent the depression 246 can be configured to face a corresponding angled surface of the protrusion 242. The protrusion's angled surface can be configured to move along the base's angled surface in response to user actuation of the movement mechanism, so as to facilitate movement of the protrusion 242 into and out of the first cam's opening 236 and into and out of the lock assembly's depression 246, as discussed further below. The protrusion 242 can thus be configured to slidably move relative to the base 240 along the base's angled surface.

The detent element 244 can be configured to bias the lock assembly 214 to a proximal position with the protrusion 242 positioned outside the first cam's opening 236 and positioned within the depression 246, as shown in FIG. 5. The detent element 244 can thus be configured to bias the stylus 200 to the expanded configuration. The detent element 244, e.g., a proximal end thereof, can be coupled to a distal end of the base 240 and extend distally therefrom. The detent element 244 includes a spring in the illustrated embodiment, but the detent element 244 can include any of a variety of mechanisms configured to provide a biasing force configured to hold the detent element 244 in a fixed position relative to the first cam 216. A distal end of the detent element 244 can be coupled to a proximal end of the hardware assembly 212, as shown in FIGS. 4 and 5. Examples of the detent element 244 include one spring (as in the illustrated embodiment), a plurality of springs, one magnet, a plurality of magnets, a lever, a plurality of levers, etc. If the detent element 244 includes one or more magnets, the hardware assembly 212 can include one or more corresponding magnets on a proximal end thereof configured to repel the detent element so as to bias the lock assembly 214 to the proximal position with the protrusion 242 positioned outside the first cam's opening 236.

The lock assembly 214 can be configured to be positioned within the inner lumen 228 of the first cam 216, as shown in FIGS. 4 and 5. The lock assembly 214 can be configured to move within the inner lumen 228 relative to the first cam 216 in response to user actuation of the movement mechanism, so as to facilitate movement of the stylus 200 between the expanded and unexpanded configurations, as discussed further below. The base 240 and the detent element 244 can be configured to move longitudinally within the first cam's inner lumen 228. The protrusion 242 can be configured to move non-longitudinally within the first cam's inner lumen 228, e.g., in a direction perpendicular to a longitudinal axis of the first cam's inner lumen 228. The protrusion 242 can be configured to move along the base's angled surface so as to move the protrusion 242 into and out of the first cam's opening 236 in response to user actuation of the movement mechanism, so as to facilitate movement of the stylus 200 between the expanded and unexpanded configurations, as discussed further below.

The second cam 218 can have a variety of sizes, shapes, and configurations. The second cam 218 can include a proximal connector element 248, a proximal lock surface 250, a distal cam surface 252, and a distal push rod 254. The proximal connector element 248, shown in FIGS. 4 and 5, can be configured to connect the second cam 218 to the slider assembly 222 in a fixed position relative to the slider assembly 222. The proximal connector element 248 includes a hole formed in the second cam's proximal end in the illustrated embodiment, but the proximal connector element 248 can have other configurations, such as a protrusion, adhesive, a magnet, etc.

The proximal lock surface 250, e.g., a lock surface that faces proximally, can be positioned a distance distally from the proximal connector element 248, as shown in FIG. 6. The proximal lock surface 250 can be configured to abut the cover 220 so as to facilitate locking of the second cam 218 in a fixed rotational position relative to the cover 220 and to facilitate holding the stylus 200 in the unexpanded configuration, as discussed further below. The proximal lock surface 250 can include at least one angled surface. As in the illustrated embodiment, the at least one angled surface 250 can include a plurality of angled surfaces 250. The plurality of angled surfaces 250 can include a sawtooth pattern, as in the illustrated embodiment, in which a plurality of saw teeth are arranged radially around the second cam 218.

The second cam's distal cam surface 252, e.g., a cam surface that faces distally, can be configured to abut the cam surface 238 of the first cam 216. The second cam's cam surface 252 can include at least one angled surface, which can help stably and controllably rotate the second cam 218 relative to the first cam 216 when the second cam's cam surface 252 engages the first cam's cam surface 238. As in the illustrated embodiment, the second cam's at least one angled surface 252 can include a plurality of angled surfaces 238. The plurality of angled surfaces 252 can include a sawtooth pattern, as in the illustrated embodiment, in which a plurality of saw teeth are arranged radially around the second cam 218. A number of the second cam's angled surface(s) 252 can equal a number of the first cam's angled surface(s) 238 such that each of the second cam's angled surface(s) 252 can abut a corresponding one of the first cam's angled surface(s) 238.

The second cam's distal push rod 254 can be configured to selectively engage the lock assembly 214. The distal push rod 254 has a cylindrical shape in the illustrated embodiment, but the distal push rod 254 can have other shapes. The distal push rod 254 can be configured to translate longitudinally in the inner lumen 228 of the first cam 216 and an inner lumen 256 of the cover 220 in response to pushing of the slider assembly 222 in the distal direction. A distal surface 258 of the distal push rod 254 can be configured to selectively abut a proximal surface 260 of the lock assembly's base 240. When the stylus 200 is in the unexpanded configuration, the distal push rod's distal surface 258 can abut the base's proximal surface 260, as shown in FIG. 4. When the stylus 200 is in the expanded configuration, the distal push rod's distal surface 258 can be spaced a distance away from the base's proximal surface 260, as shown in FIG. 5. As discussed further below, pushing the slider assembly 222 distally causes the distal push rod 254 to be pushed distally, which consequently pushes the distal push rod's distal surface 258 to push against the lock assembly base's proximal surface 260, thereby moving the base 240 and the detent element 244 longitudinally within the first cam's inner lumen 228.

The cover 220 can have a variety of sizes, shapes, and configurations. The cover 220 can include an elongate member having an inner lumen 256 extending between proximal and distal ends 260, 262 thereof. The elongate member can be cylindrical, as in the illustrated embodiment.

An interior sidewall of the cover 220 can have a longitudinal groove, longitudinal channel, or longitudinal slot 234 generally referred to herein as a "longitudinal groove," formed therein. The longitudinal groove 234 can be configured to slidably receive the second cam 218 therein. The longitudinal groove 234 can extend along an entire longitudinal length of the cover 220 between proximal and distal ends thereof, as in the illustrated embodiment, which can facilitate guided longitudinal movement of the second cam 218 within the inner lumen 234 of the cover 220 during expansion and compression of the stylus 200.

The interior sidewall of the cover 220 can have a distal lock surface 264, e.g., a lock surface that faces distally, therein. The distal lock surface 264 can be configured to abut the proximal lock surface 250 of the second cam 218 so as to facilitate locking of the second cam 218 in a fixed rotational position relative to the cover 220 and to facilitate holding the stylus 200 in the unexpanded configuration. The distal lock surface 264 can include at least one angled surface. As in the illustrated embodiment, the at least one angled surface 264 can include a plurality of angled surfaces 264. The plurality of angled surfaces 264 can include a sawtooth pattern, as in the illustrated embodiment, in which a plurality of saw teeth are arranged radially around the cover 220.

The slider assembly 222 can have a variety of sizes, shapes, and configurations. The slider assembly 222 can include an elongate member 266 and a biasing element 268. The elongate member 266 can include a tube having an inner lumen 270 extending between proximal and distal ends 272, 274 thereof. The elongate member's proximal end 272 can be configured to be actuated by a user, e.g., pushed distally thereon, to cause movement of the stylus 200 between the expanded and unexpanded configurations, as discussed further below. The elongate member's proximal end 272 can define the stylus's proximal end 225. The elongate member 266 can be cylindrical, as in the illustrated embodiment.

The elongate member's distal end 274 can include a distal connector element 278 configured to connect the slider assembly 222 to the second cam 218. The distal connector element 278 can be configured to mate with the second cam's proximal connector element 248. The distal connector element 278 includes a protrusion in the illustrated embodiment, but the distal connector element 278 can have other configurations, such as a hole, adhesive, a magnet, etc.

The biasing element 268 can be configured to be disposed within the elongate member's inner lumen 270. As in the illustrated embodiment, the biasing element 268 can be disposed entirely within the elongate member's inner lumen 270. The biasing element 268 includes a spring in the illustrated embodiment, but the biasing element 268 can include any of a variety of mechanisms configured to provide a biasing force.

The biasing element 268 can be configured to be movable relative to the elongate member 266 within the elongate member's inner lumen 270 between compressed and natural configurations to facilitate movement of the stylus 200 between the expanded and unexpanded configurations. The natural configuration can be the default configuration to the biasing element 268 is biased. When the stylus 200 is in the unexpanded configuration, the biasing element 268 can be in the compressed configuration, as shown in FIG. 4. The biasing element 268 of the slider assembly 222 can be fully compressed when in the compressed configuration. When stylus 200 is in the expanded configuration, the biasing element 268 can be in the natural configuration, as shown in FIG. 5. The biasing element 268 can be configured to provide a biasing force to facilitate movement of the stylus 200 from the unexpanded configuration to the expanded configuration, as discussed further below.

Figure 11:
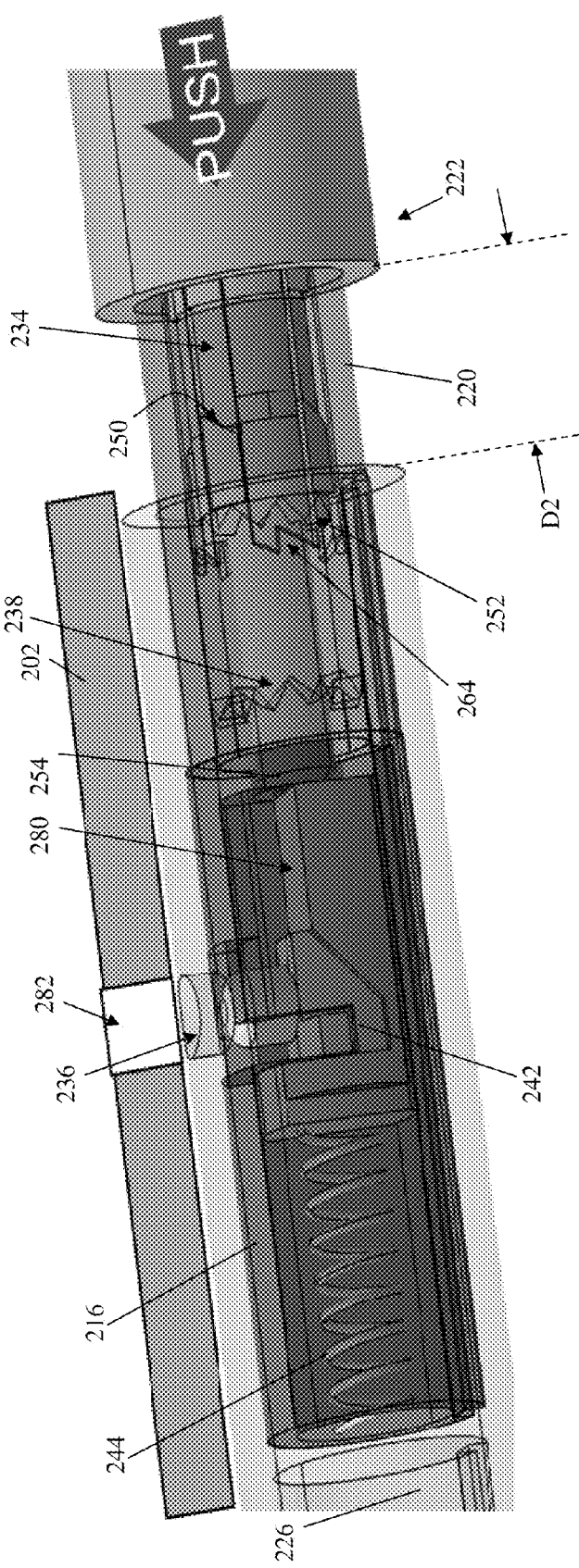
FIG. 11 is a partial transparent perspective view of the stylus of FIG. 5.

As mentioned above, the stylus 200 can be configured to move between the unexpanded and expanded configuration when the stylus's movement mechanism is manually actuated by a user. An embodiment of moving the stylus 200 between the expanded and unexpanded configurations is discussed below with respect to FIGS. 3-5 and 7-15. FIGS. 3, 4, 10, and 12 and a portion of FIG. 15 show the stylus 200 in the unexpanded configuration, with FIGS. 3 and 10 also showing the stylus 200 disposed within the electronic device's cavity 204. FIGS. 5, 11, and 14 and a portion of FIG. 13 show the stylus 200 in the expanded configuration, with FIG. 11 also showing the stylus 200 disposed within the electronic device's cavity 204. FIGS. 7-9, a portion of FIG. 13, and a portion of FIG. 15 show the stylus 200 in intermediate configurations that are between the expanded and unexpanded configurations.

When the stylus 200 is in the unexpanded configuration in the cavity 204, the stylus's proximal end 225, e.g., the slider assembly's proximal end 272, can be pushed distally relative to the electronic device 202. The distal pushing can cause the elongate member 266 of the slider assembly 222 to move distally relative to the stylus's outer housing 226, the cover 220, and the first cam 216. A gap 276, shown in FIGS. 3 and 4, between the elongate member 266 and the outer housing 226 can allow for the elongate member's 266 distal movement even though the stylus 200 is in the unexpanded configuration within the cavity 204. The gap 276 can have a first depth D1 when the stylus 200 is in the unexpanded configuration. The distal movement of the elongate member 266 can cause the depth of the gap 276 to be less than the first depth D1 as the elongate member 266 moves distally toward the outer housing 226. The biasing element 268 of the slider assembly 222 can be fully compressed when the stylus 200 is in the unexpanded configuration such that the distal pushing of the stylus 200 does not cause any further compression of the biasing element 268.

The second cam 218, which can be held in a fixed position relative to the elongate member 266 attached thereto via the proximal and distal connector elements 248, 278, can move distally relative to the outer housing 212, the cover 220, and the first cam 216 when the elongate member 266 is pushed distally. The distal push rod's distal surface 258 of the second cam 218 can abut the base's proximal surface 260 of the lock assembly 214 when the stylus 200 is in the unexpanded configuration such that distal movement of the second cam 218 can cause the distal push rod 254 to push distally on the lock assembly's base 240. The base 240 can thus be pushed distally within the first cam's inner lumen 228, thereby compressing the detent element 244 and causing the protrusion 242 to slide along a top surface 280 of the base 240 as the base 240 moves distally. The protrusion 242 remains positioned in the first cam's opening 236 and in an opening, window, or hole 282, generally referred to herein as an "opening," formed in the electronic device 202. Because the first cam 216 can remain in a fixed position relative to the cavity 204 when the stylus 200 is pushed distally, the first cam's opening 236 can remain aligned with the device's opening 282 such that the protrusion 242 can remain in a fixed position within the openings 236, 282 as the protrusion 242 slides along the base's top surface 280.

The proximal and distal lock surfaces 250, 264 can abut one another when the stylus 200 is in the unexpanded configuration, as shown in FIGS. 10 and 12. Also when the stylus 200 is in the unexpanded configuration, the distal cam surface 252 of the second cam 218 can be positioned a distance away from the cam surface 238 of the first cam 216. The distal movement of the second cam 218 relative to the cover 220 when the elongate member 266 is pushed distally can cause the proximal lock surface 250 of the second cam 218 to move distally so as to no longer abut the distal lock surface 264 of the cover 220. As shown in FIGS. 12 and 13, the second cam 218 can move from having its proximal lock surface 250 abutting the cover's distal lock surface 264 (FIG. 12) to a position closer to the first cam 216 (first three sequential images of FIG. 13) and then to a maximum distance away from the first cam 216 when the stylus 200 is in the expanded configuration (last sequential image of FIG. 13). The distal cam surface 252 of the second cam 218 can thus first move distally toward the cam surface 238 of the first cam 216 and then move away therefrom. In other words, in response to the user pushing on the stylus's proximal end 225 when the stylus 200 is in the unexpanded configuration, the second cam 218 can first move longitudinally toward the first cam 216, and then the second cam 218 can move longitudinally away from the first cam 216 to move the stylus 200 to the expanded configuration.

In addition to the second cam 218 moving longitudinally relative to the first cam 216 when the movement mechanism is actuated when the stylus 200 is in the unexpanded configuration, the second cam 218 can rotate relative to the first cam 216 when the movement mechanism is actuated when the stylus 200 is in the unexpanded configuration. Such rotation is illustrated in FIGS. 12 and 13. The rotation of the second cam 218 can be about a longitudinal axis of the stylus 200, which can also be the longitudinal axes of the outer housing 212, the first cam 216, the second cam 218, and the slider assembly's elongate member 266. An angle of rotation of the second cam 218 when moving between the expanded and unexpanded configurations can be, e.g., 30°. In other words, one actuation of the movement mechanism can cause the second cam 218 to rotate an at angle of, e.g., 30°. The immediately succeeding actuation of the movement mechanism can cause the second cam 218 to rotate an at the same angle in the same direction, e.g., rotating clockwise with each movement mechanism. The second cam 218 can be configured to always rotate in that same direction such that the second cam 218 can be configured to rotate 360° over a series of sequential actuations of the movement mechanism.

The rotation of the second cam 218 relative to the first cam 216 can be caused by engagement of the second cam's cam surface 252 with the first cam's cam surface 238. When the second cam 218 moves longitudinally relative to and toward the first cam 216, the second cam's cam surface 252 consequently moves longitudinally relative to and toward the first cam's cam surface 238. This distal movement of the second cam 218 eventually abuts the second cam's cam surface 252 against the first cam's cam surface 238. The second cam 218 can be positioned rotationally relative to the first cam 216 such that the sawtooth teeth of the second cam's cam surface 252 are rotationally offset from the sawtooth teeth of the first cam's cam surface 238, as shown in FIGS. 10 and 12 and in the first sequential image of FIG. 13. In other words, when the stylus 200 is in the unexpanded configuration, the second cam's cam surface 252 can be rotationally offset from the first cam's cam surface 238. Abutment of the second cam's cam surface 252 against the first cam's cam surface 238 can cause the second cam 218 to rotate relative to the first cam 216 as the second cam's cam surface 252 is cammed by the stationary first cam's cam surface 238. In other words, the angled surfaces of the second cam's cam surface 252 can cam against or slide along the angled surfaces of the first cam's cam surface 238 so as to rotate the second cam 218. The user's distal pushing force on the stylus 200 can cause the second cam 218 to move toward the first cam 216 and the second cam's cam surface 252 to contact and move relative to the first cam's cam surface 238.

Rotation of the second cam 218 can be relative to the first cam 216 as well as relative to the cover 220 and the slider assembly's engagement member 266. Rotation of the second cam 218 relative to the cover 220 can cause the proximal lock surface 250 of the second cam 218 to rotate out of alignment with the distal lock surface 264 of the cover 220, as shown in FIGS. 12 and 13. The second cam 218 can thereby be configured to move proximally relative to the cover 220 without the proximal lock surface 250 of the second cam 218 abutting the distal lock surface 264 of the cover 220. Instead, the proximal lock surface 250 of the second cam 218 can be allowed move proximally into the longitudinal groove 234 of the engagement member 266.

When the user removes the distal pushing force on the stylus 200, the second cam 218 has already pushed the lock assembly's base 240 distally and compressed the detent element 244, and the second cam 218 has already rotated relative to the first cam 216. Removal of the distal pushing force can allow the detent element 244 to expand, thereby moving the base 240 proximally. The base's proximal movement can push the base's proximal surface 260 in a proximal direction against the distal push rod's distal surface 258, thereby pushing the second cam 218 proximally. Because the second cam 218 has rotated out of alignment from the distal lock surface 264 of the cover 220, the second cam 218 is free to move proximally into the longitudinal groove 234 of the engagement member 266 instead of being prevented from moving proximally by the distal lock surface 264. FIG. 11 and the last sequential image of FIG. 13 show the second cam 218 positioned within the longitudinal groove 234 with the second cam's proximal lock surface 250 positioned proximal to the cover's distal lock surface 264.

Expansion of the detent element 244 so as to move the base 240 in a proximal direction can cause the protrusion 242 to slide distally along the base's top surface 280 and slide the protrusion 242 distally off the top surface 280, as shown in FIG. 7. FIG. 7 shows the facing angled surfaces of the protrusion 242 and the base 240 as not being in direct contact, but the facing angled surfaces can be in direct contact. Continued expansion of the detent element 240 and corresponding continued movement of the base 240 in a proximal direction can cause the angled surface of the protrusion 242 to slide along the base's angled surface, as shown in FIGS. 8 and 9, such that the protrusion 242 enters the depression 246 formed in the base 240 and moves out of the opening 282 of the electronic device 202 and then out of the opening 236 of the first cam 216. When the protrusion 242 is outside of the electronic device's opening 282, the stylus 200 can be freely moved out of the cavity 204 by moving the stylus 200 proximally out of the cavity 204, such as by pulling the stylus 200 out by hand.

The protrusion 242 can be configured to enter the depression 246 by the force of gravity. The stylus 200 can include a return mechanism (not shown) configured to facilitate entry of the protrusion 242 into the depression 246. The return mechanism can be configured to provide a biasing force that moves the protrusion 242 into the depression 246. When the protrusion 242 is positioned outside the depression 246, the biasing force can be released so as to move the protrusion into the depression 246. Examples of the return mechanism include a spring and a magnet.

When the stylus 200 is in the expanded configuration, the gap 276 between the elongate member 266 and the outer housing 226 can have a second depth D2 that is greater than the first depth D1 of the gap 276 when the stylus 200 is in the unexpanded configuration.

The stylus 200 can be moved from the expanded configuration to the unexpanded configuration in reverse action of moving the stylus 200 from the unexpanded configuration to the expanded configuration. FIGS. 14 and 15 illustrate movement of the stylus 200 from the expanded configuration (FIG. 14) to the unexpanded configuration (last sequential image of FIG. 15).

Figure 16:
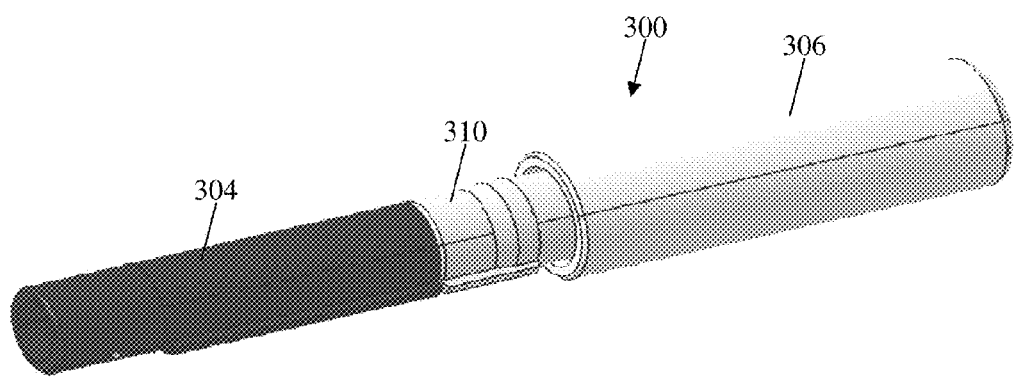
FIG. 16 is a perspective view of a first cam, a cover, and a slider assembly another embodiment of a stylus.
Figure 17:
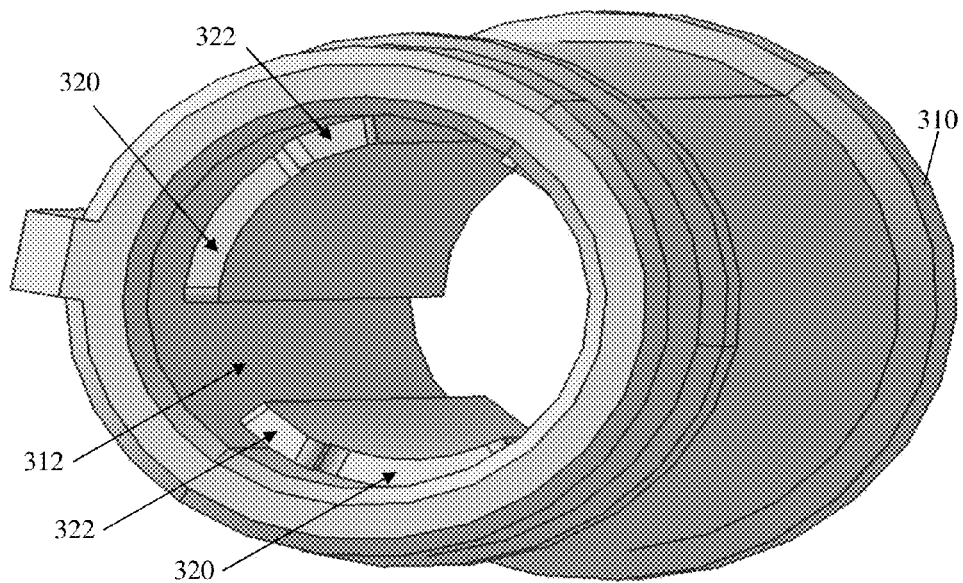
FIG. 17 is a perspective view of the cover of FIG. 16.
Figure 18:
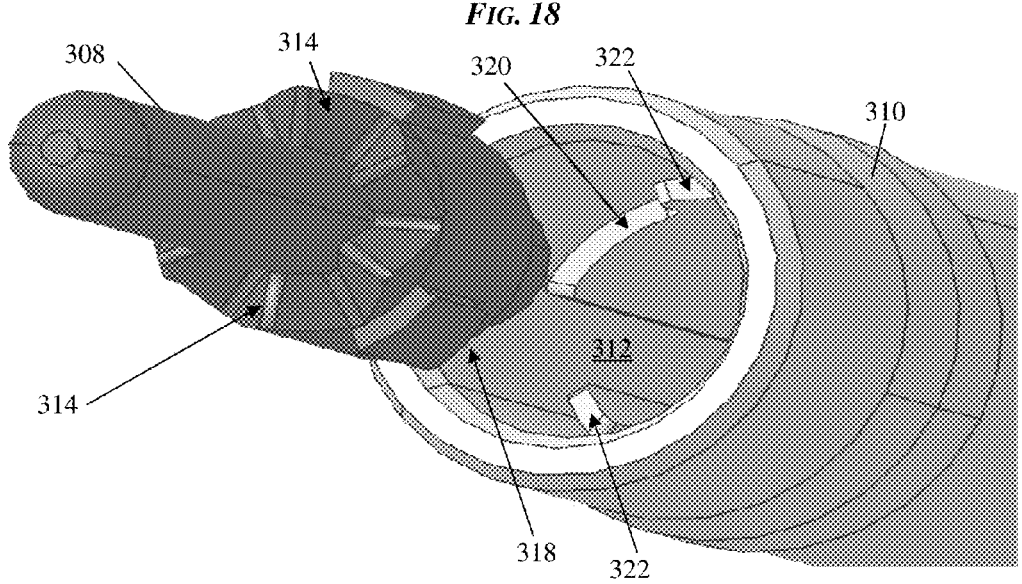
FIG. 18 is another perspective view of the cover of FIG. 16 and a second cam of the stylus of FIG. 16.

FIGS. 16-32 illustrates another embodiment of a stylus 300. The stylus 300 can be configured and used similar to other embodiments of styluses disclosed herein. As shown in FIGS. 16-18, the stylus 300 can include a first cam 304, a second cam 308, a cover 310, and a slider assembly 306. For clarity of illustration, a hardware assembly of the stylus 300 is not shown.

FIGS. 19-25 show movement of the stylus 300 from an expanded configuration (FIG. 19) to an unexpanded configuration (FIG. 25) with a plurality of intermediate configurations (FIGS. 20-24) therebetween. For simplicity of illustration, a lock assembly of the stylus 300 that includes a protrusion 302 is not shown as moving when the stylus 300 moves from the expanded configuration to the unexpanded configuration in FIGS. 19-25, but the protrusion 302 would be positioned within the first cam 304 when the stylus 300 is in the expanded configuration and be positioned at least partially outside the first cam 304 when the stylus 300 is in the unexpanded configuration.

Figure 19:
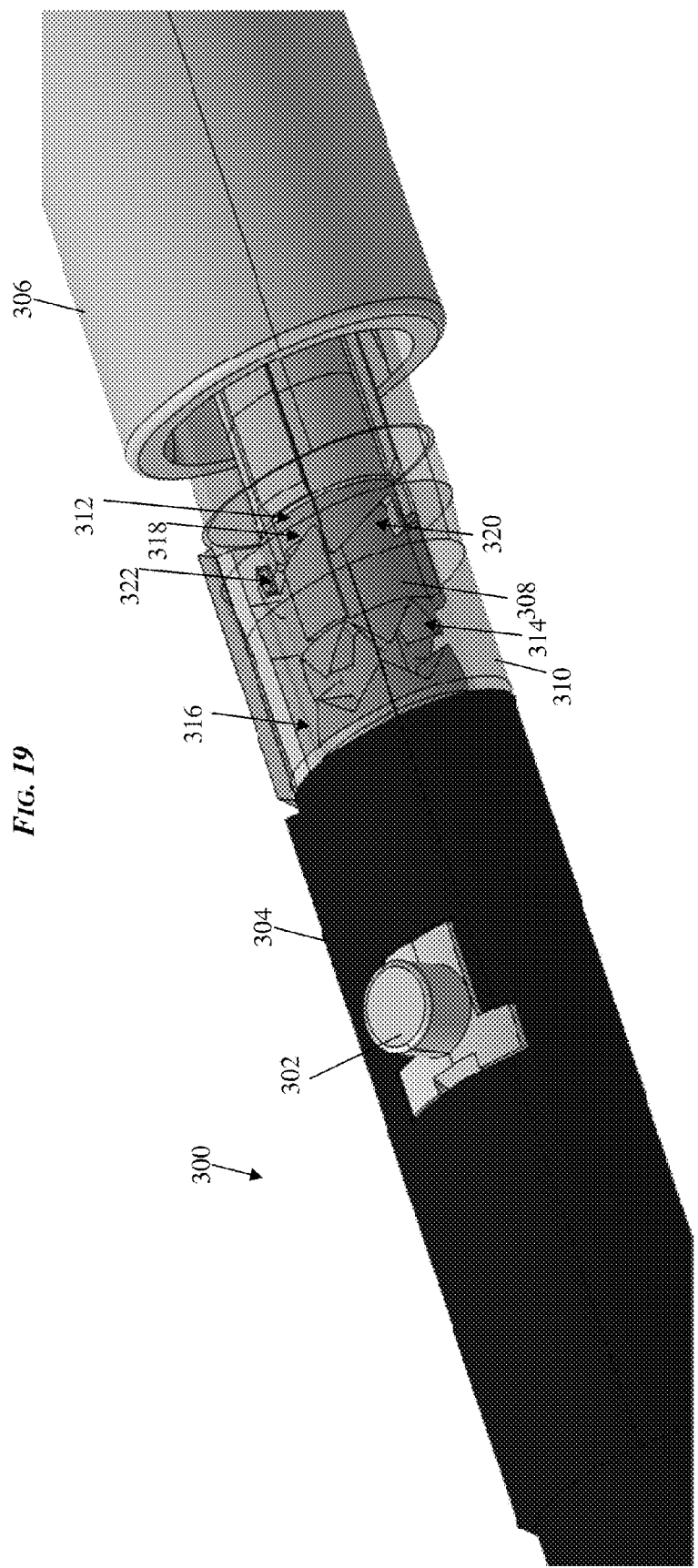
FIG. 19 is a partial transparent perspective view of the stylus of FIG. 16 in an expanded configuration.
Figure 20:
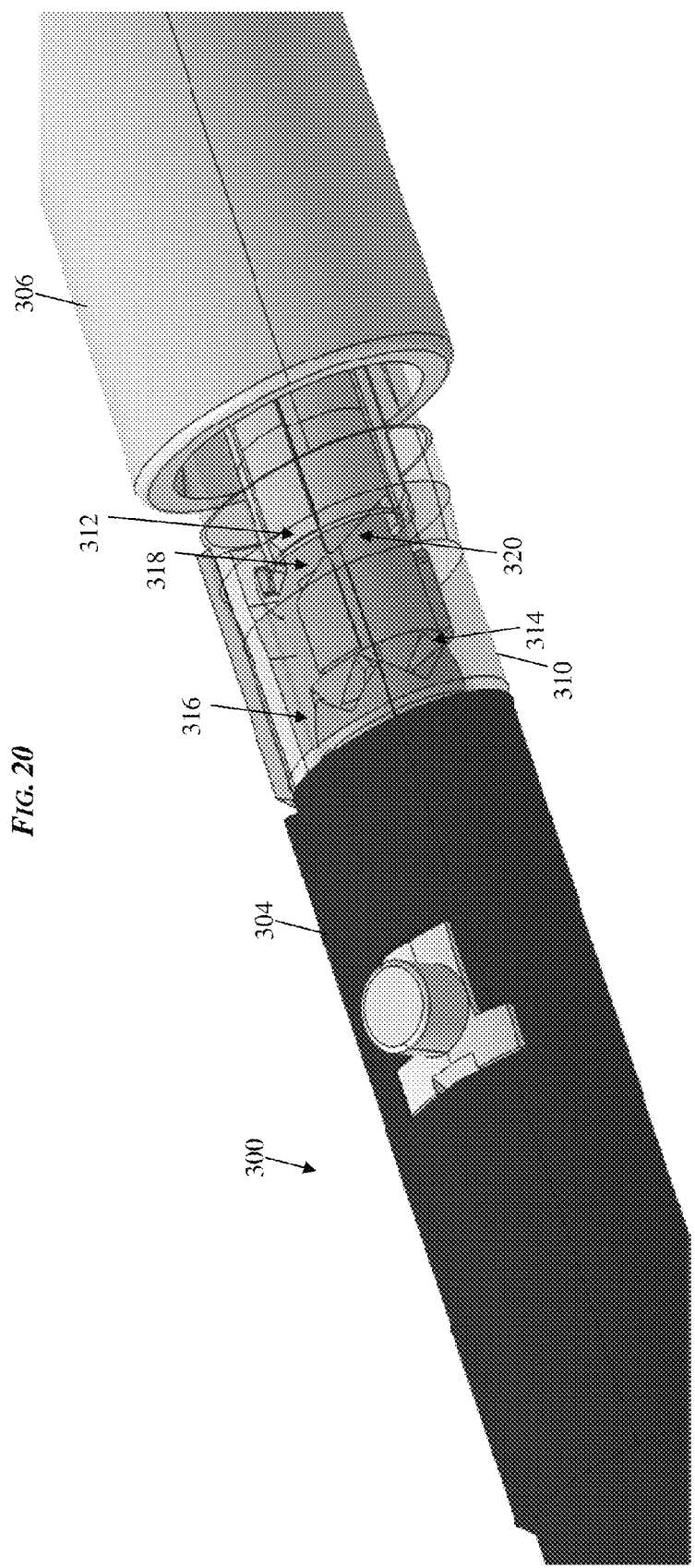
FIG. 20 is a partial cross-sectional perspective view of the stylus in an intermediate configuration subsequent to the expanded configuration of FIG. 19.
Figure 21:
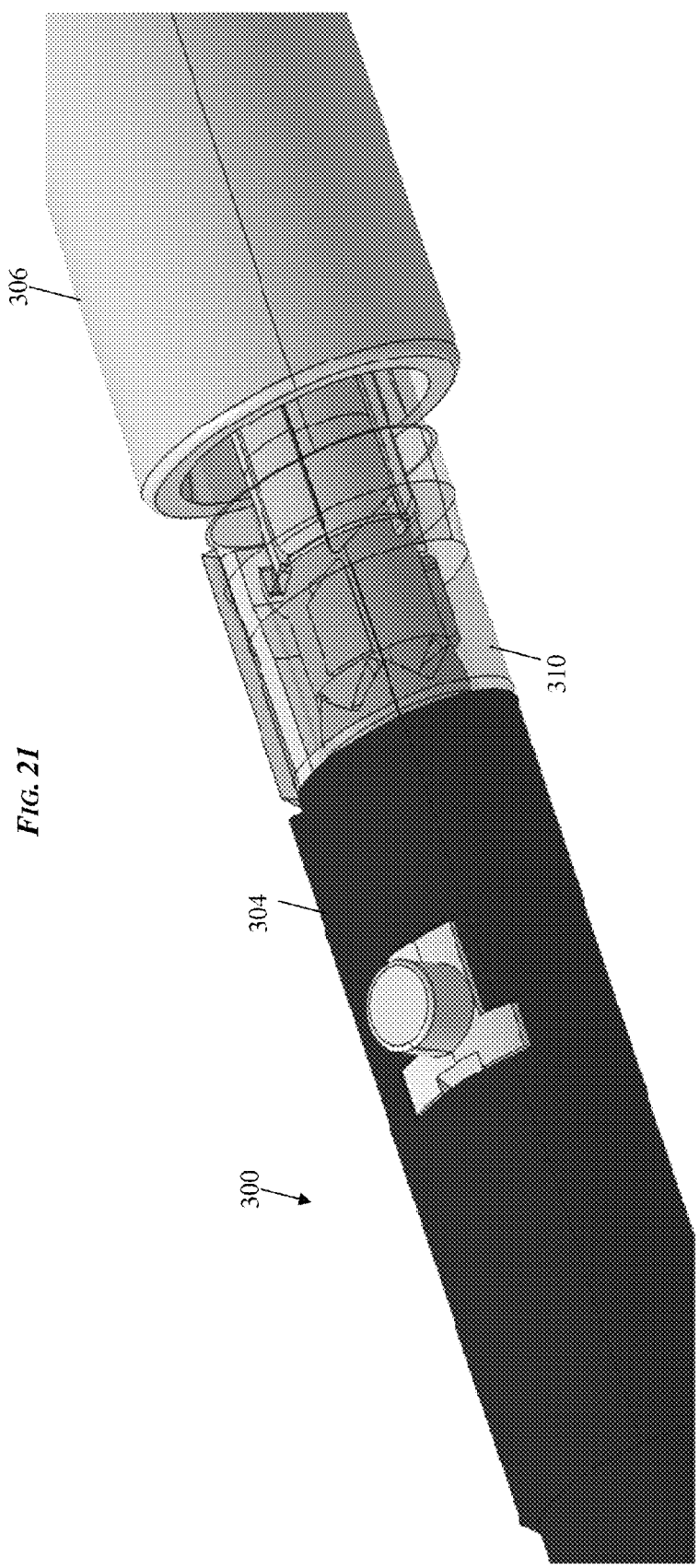
FIG. 21 is a partial cross-sectional perspective view of the stylus in an intermediate configuration subsequent to the intermediate configuration of FIG. 20.
Figure 22:
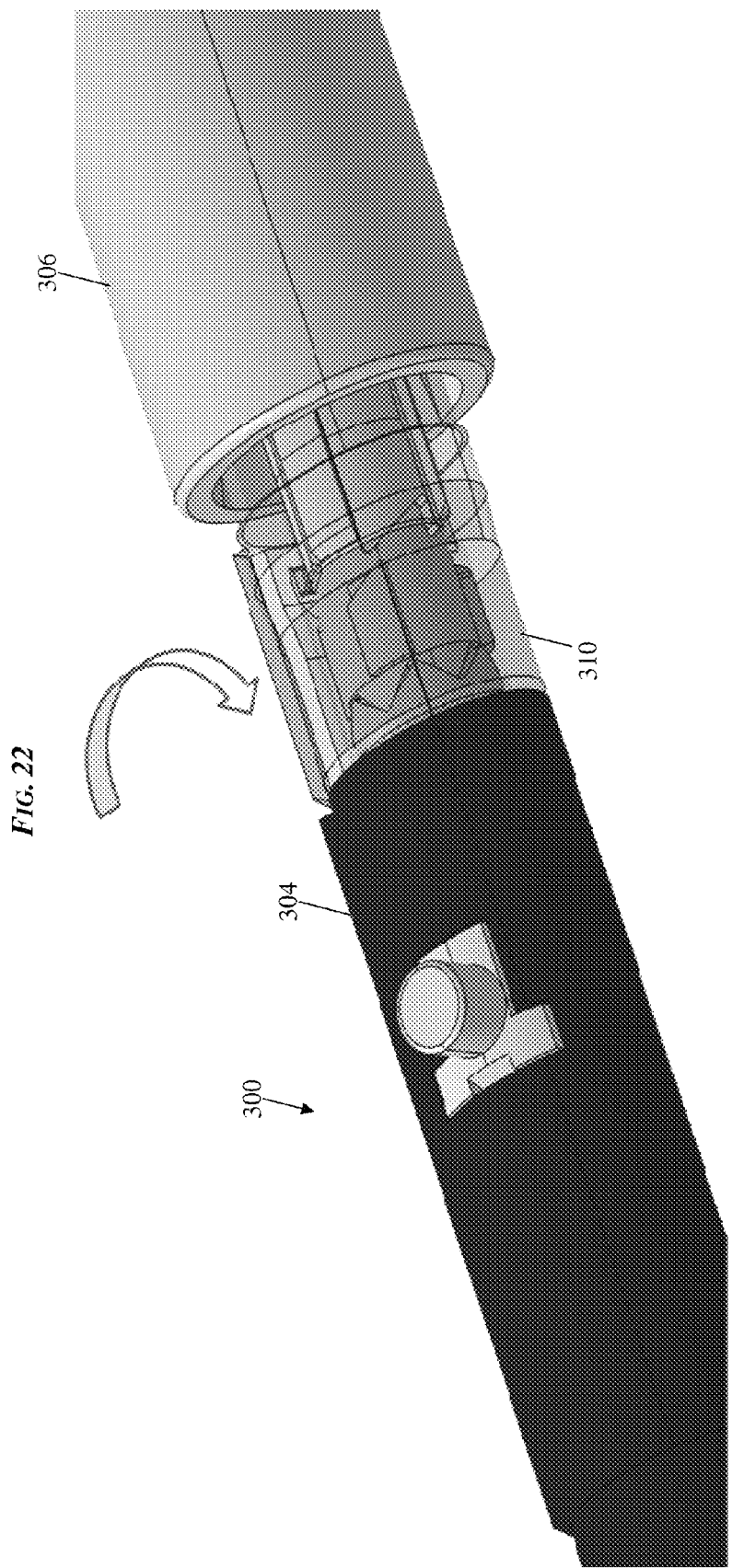
FIG. 22 is a partial cross-sectional perspective view of the stylus in an intermediate configuration subsequent to the intermediate configuration of FIG. 21.
Figure 23:
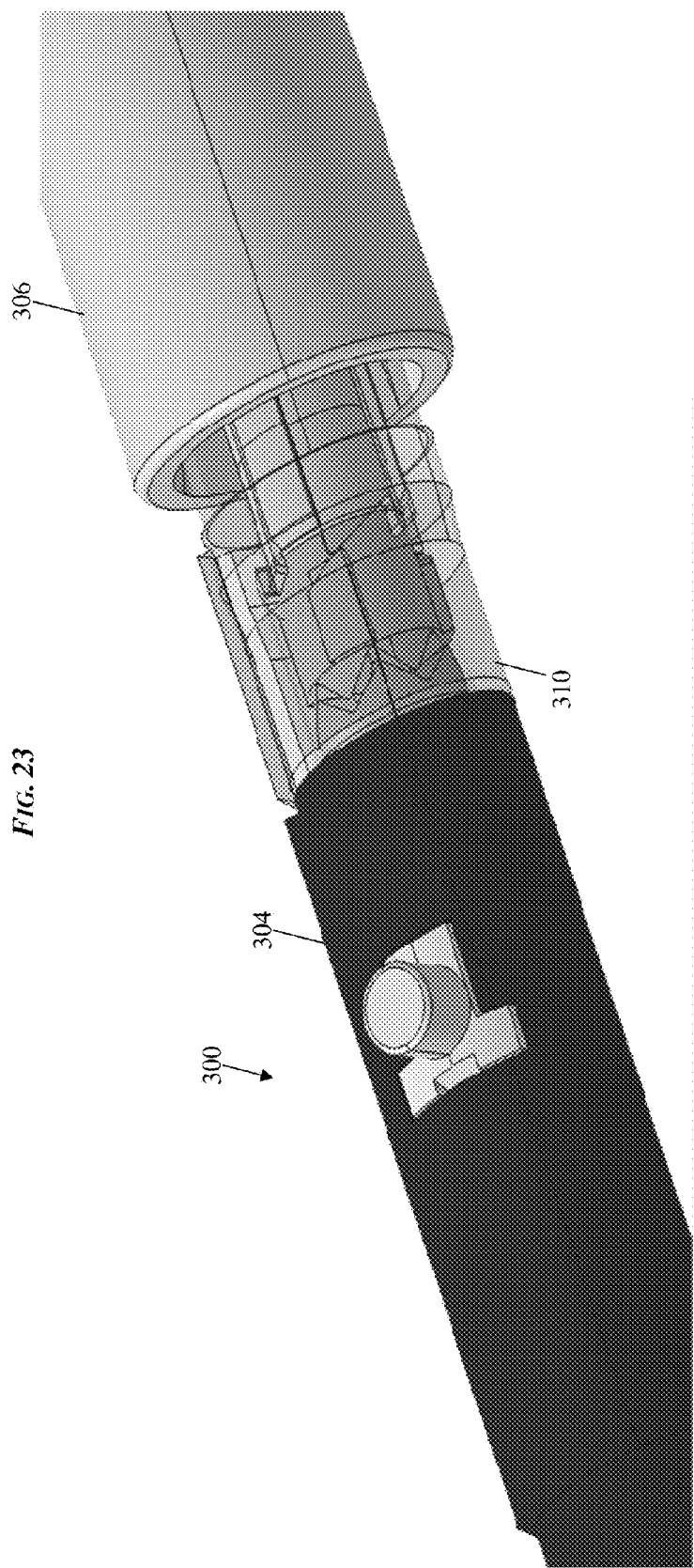
FIG. 23 is a partial cross-sectional perspective view of the stylus in an intermediate configuration subsequent to the intermediate configuration of FIG. 22.
Figure 24:
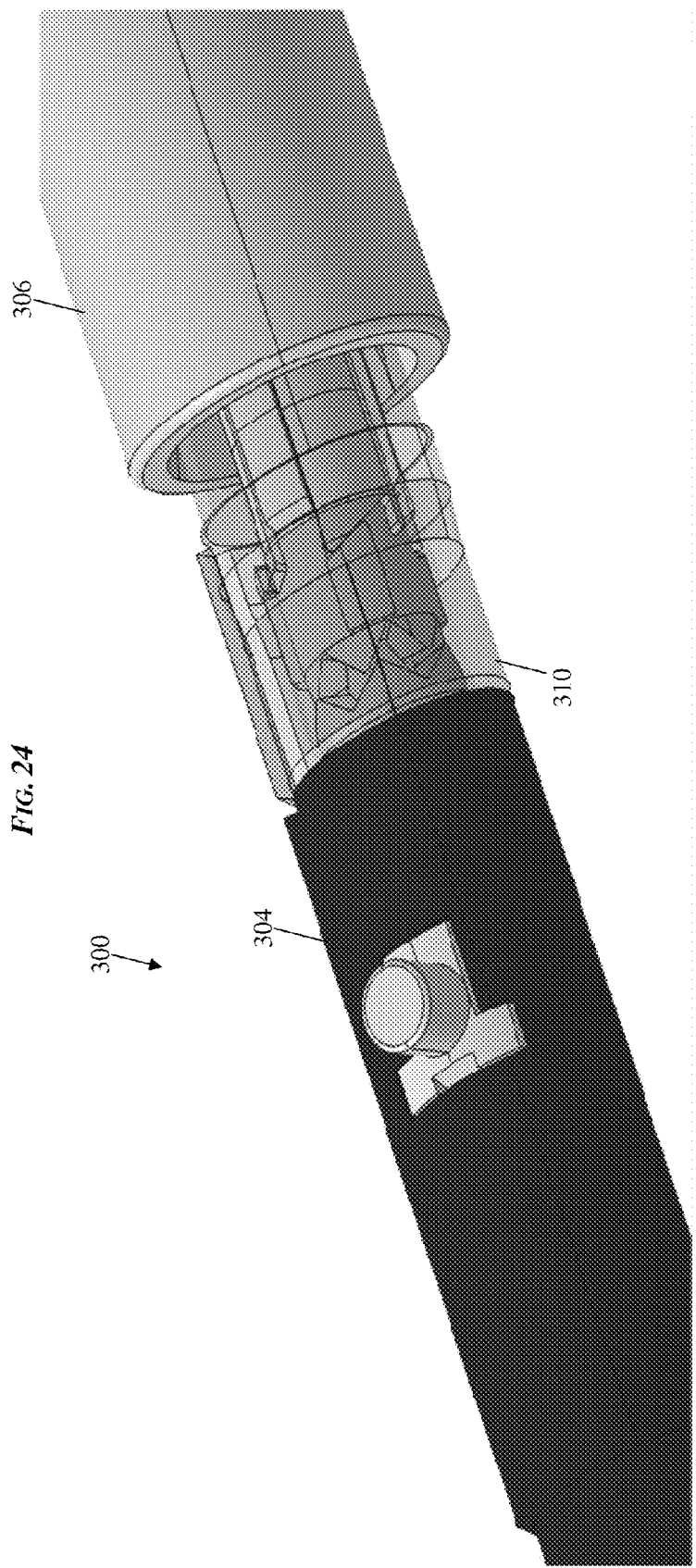
FIG. 24 is a partial cross-sectional perspective view of the stylus in an intermediate configuration subsequent to the intermediate configuration of FIG. 23.
Figure 25:
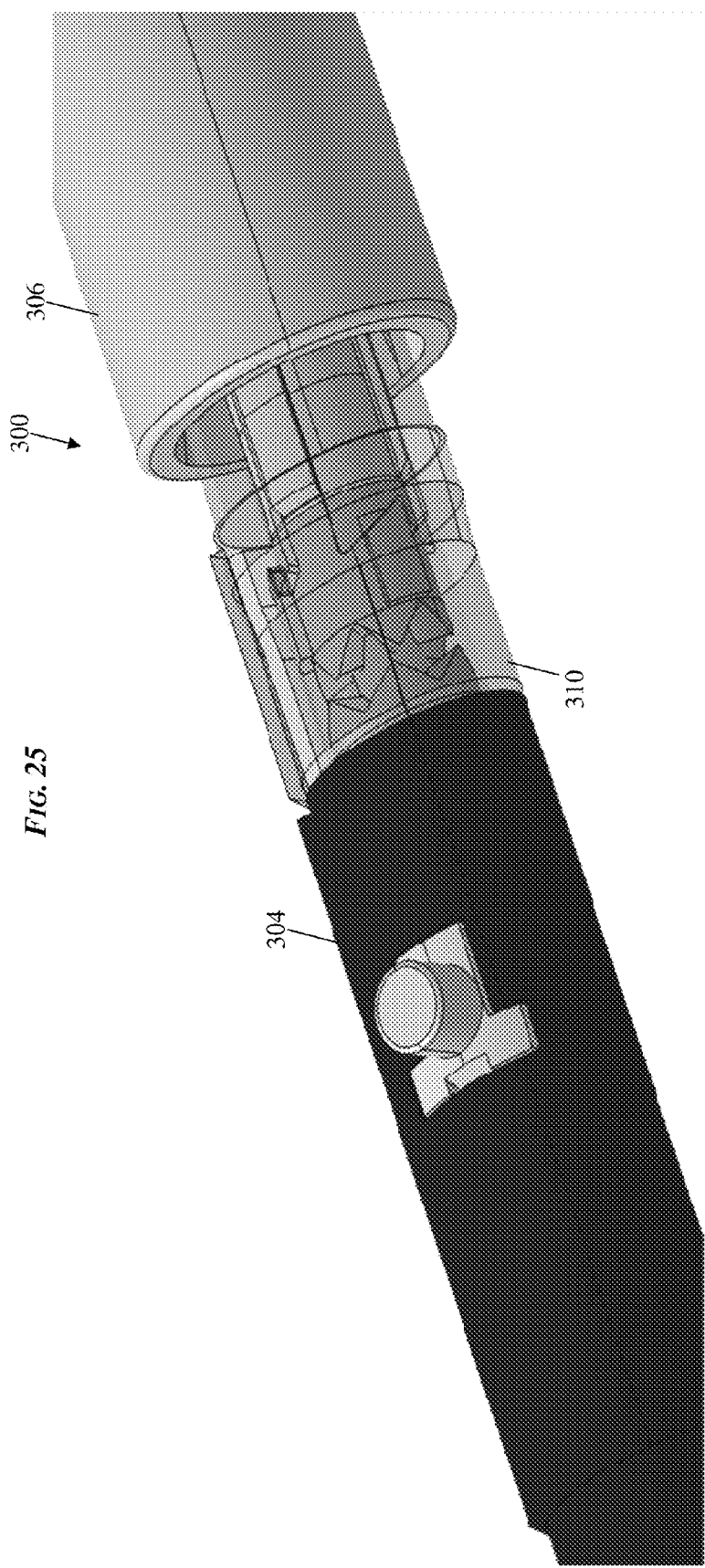
FIG. 25 is a partial cross-sectional perspective view of the stylus in an unexpanded configuration subsequent to the intermediate configuration of FIG. 24.

In general, pushing distally on the slider assembly 306 when the stylus 300 is in the expanded configuration, as shown in FIG. 19, can cause the second cam 308 to move longitudinally in a distal direction relative to the first cam 304, the cover 310, and the hardware assembly, as shown in FIG. 20. The second cam 308 can move longitudinally distally within a longitudinal groove 312 of the cover 310. A distal cam surface 314 of the second cam 308 can move into contact with a proximal cam surface 316 of the first cam 304, as also shown in FIG. 20. The contact of the cam surfaces 314, 316 can cause the second cam 308 to rotate relative to the first cam 304, the cover 310, and the hardware assembly, as shown in FIG. 22. The rotation of the second cam 308 can rotate a proximal lock surface 318 of the second cam 308 out of alignment from the longitudinal groove 312. Then, when the distal pushing force is removed from the slider assembly 306, the second cam 308 can move longitudinally in a proximal direction relative to the first cam 304, the cover 310, and the hardware assembly and can rotate relative to the first cam 304, the cover 310, and the hardware assembly, as shown in FIG. 23. The proximal lock surface 318 can move into contact with a distal lock surface 320 of the cover 310. The abutment of the proximal and distal lock surfaces 318, 320 can cause the second cam 308 to rotate relative to the first cam 304, the cover 310, and the hardware assembly, as shown in FIGS. 24 and 25. The abutting contact of the proximal and distal lock surfaces 318, 320 can lock the stylus 300 in the unexpanded configuration until another distal pushing force is applied to the stylus's slider assembly 306.

FIGS. 26-32 show movement of the stylus from the unexpanded configuration (FIG. 26) to the expanded configuration (FIG. 32) with a plurality of intermediate configurations (FIGS. 27-31) therebetween. For simplicity of illustration, the lock assembly is not shown as moving when the stylus 300 moves from the unexpanded configuration to the expanded configuration in FIGS. 26-32, but as mentioned above, the protrusion 302 would be positioned within the first cam 304 of the stylus 300 when the stylus 300 is in the expanded configuration and be positioned at least partially outside the first cam 304 when the stylus 300 is in the unexpanded configuration.

Figure 26:
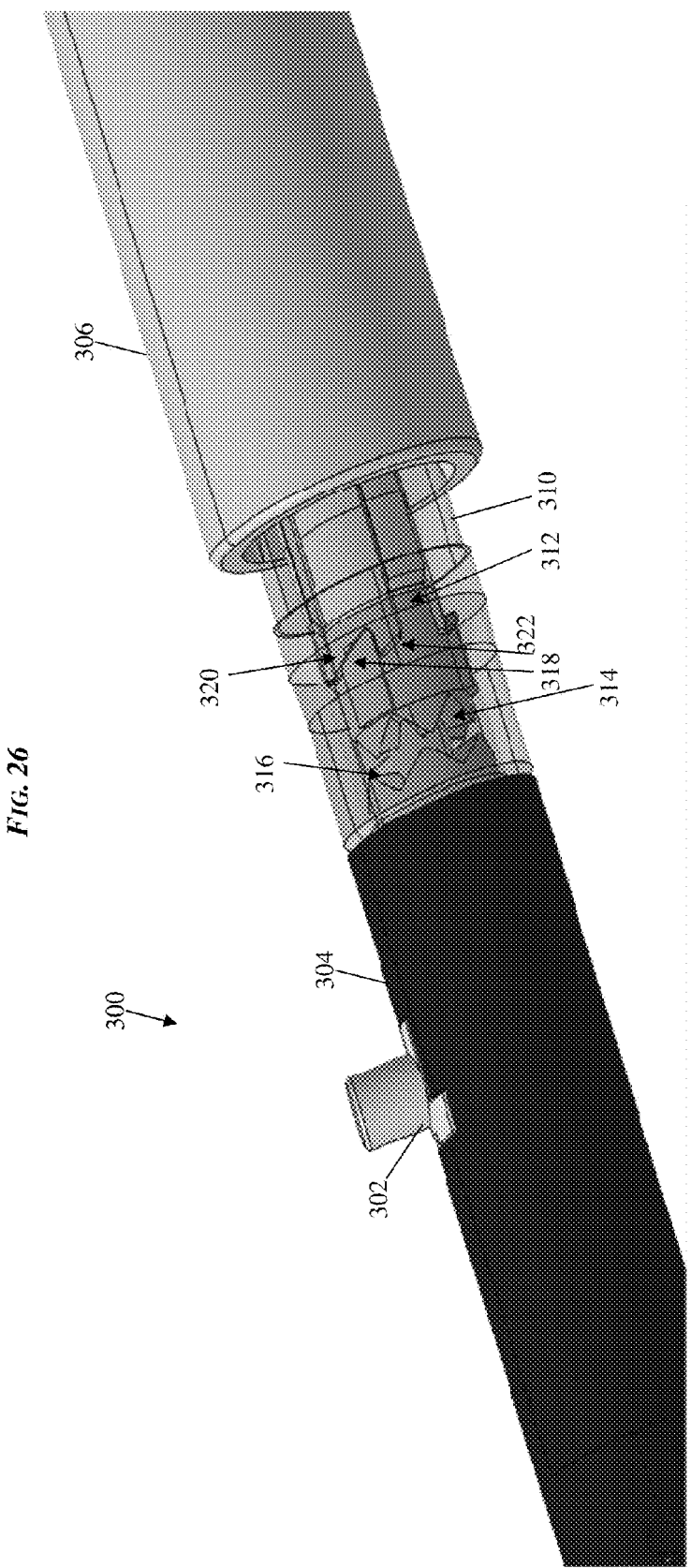
FIG. 26 is another partial cross-sectional perspective view of the stylus of FIG. 25.
Figure 27:
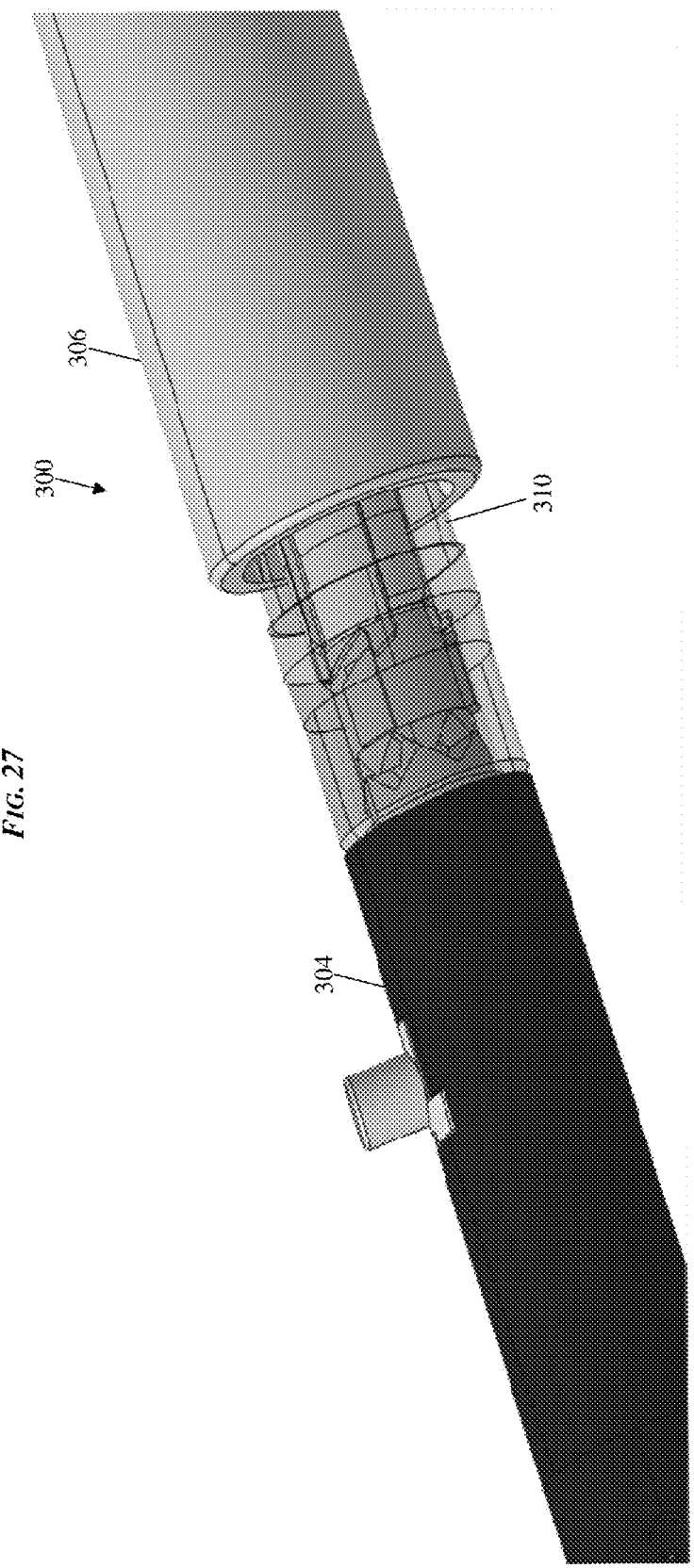
FIG. 27 is a partial cross-sectional perspective view of the stylus in an intermediate configuration subsequent to the unexpanded configuration of FIG. 26.
Figure 28:
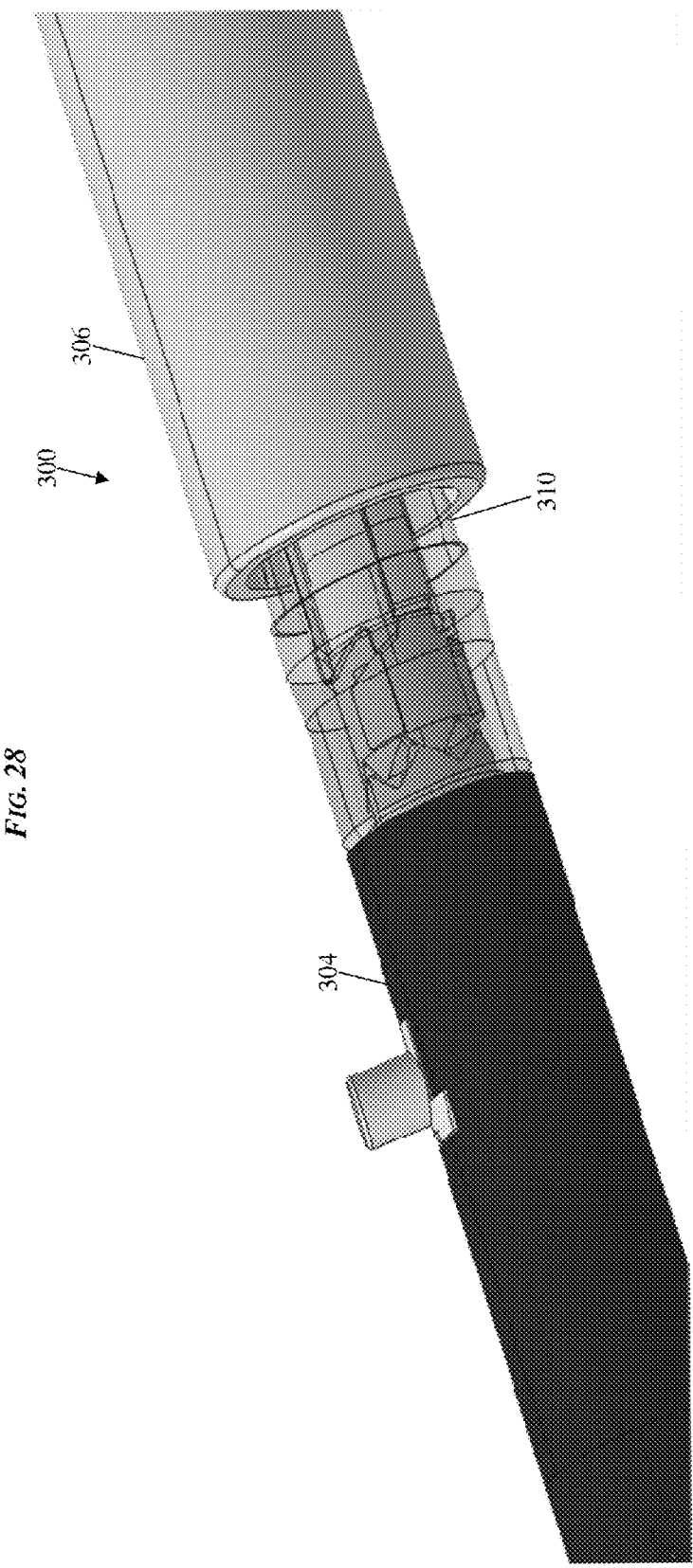
FIG. 28 is a partial cross-sectional perspective view of the stylus in an intermediate configuration subsequent to the intermediate configuration of FIG. 27.
Figure 29:
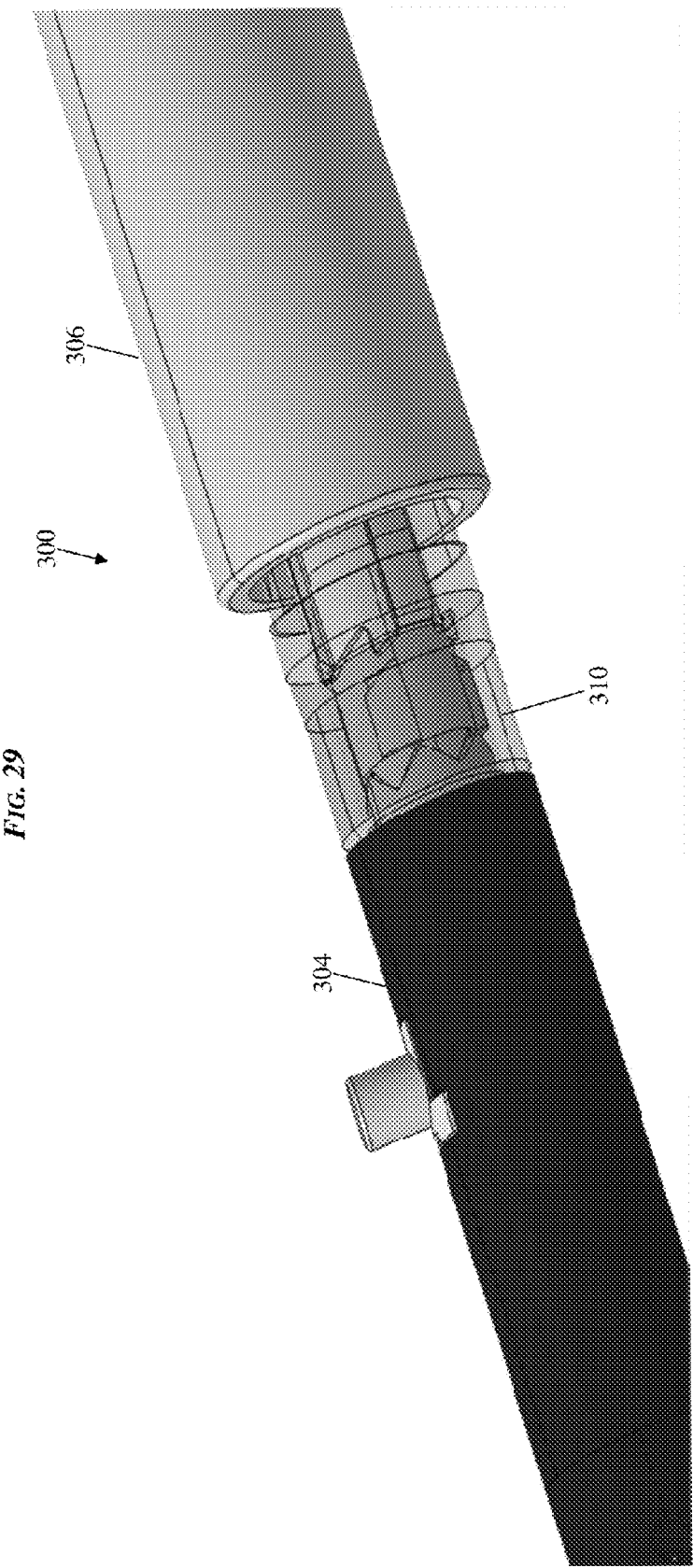
FIG. 29 is a partial cross-sectional perspective view of the stylus in an intermediate configuration subsequent to the intermediate configuration of FIG. 28.
Figure 30:
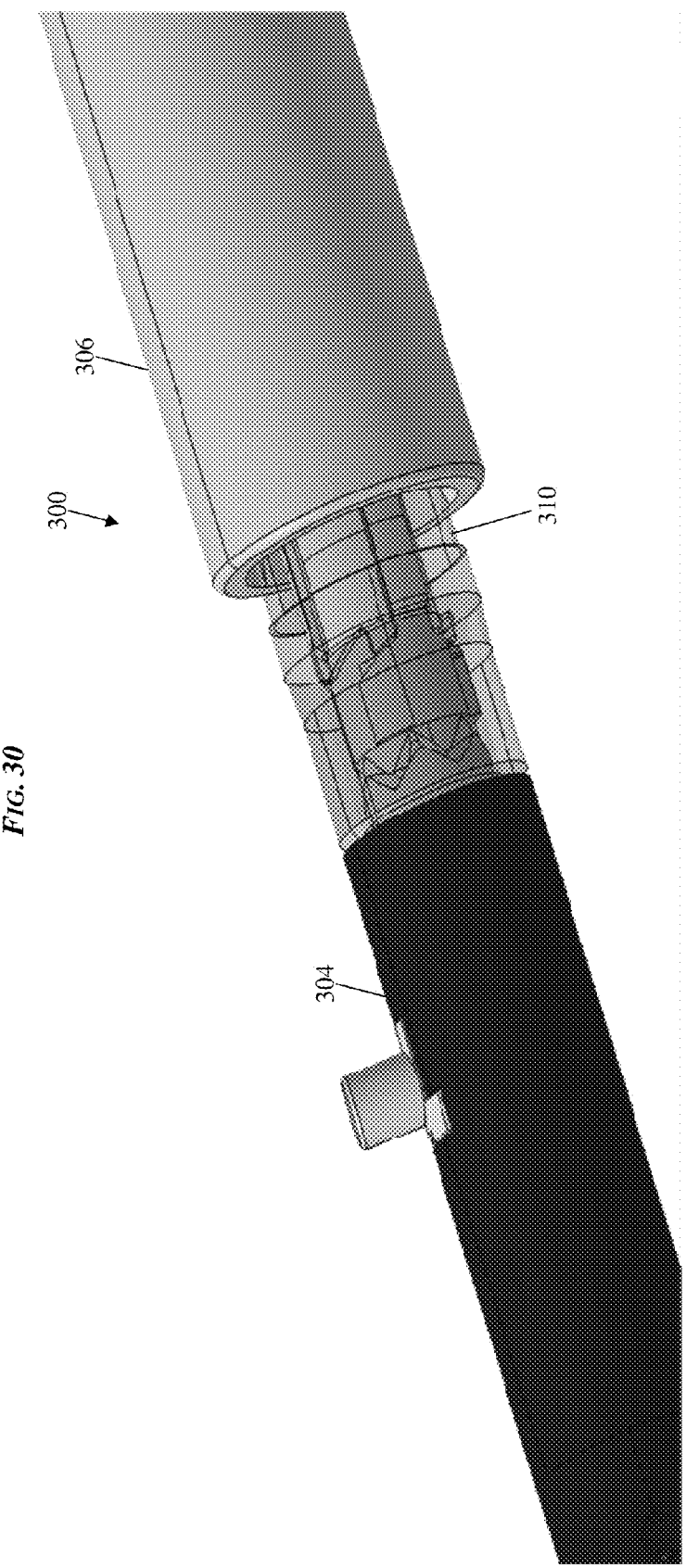
FIG. 30 is a partial cross-sectional perspective view of the stylus in an intermediate configuration subsequent to the intermediate configuration of FIG. 29.
Figure 31:
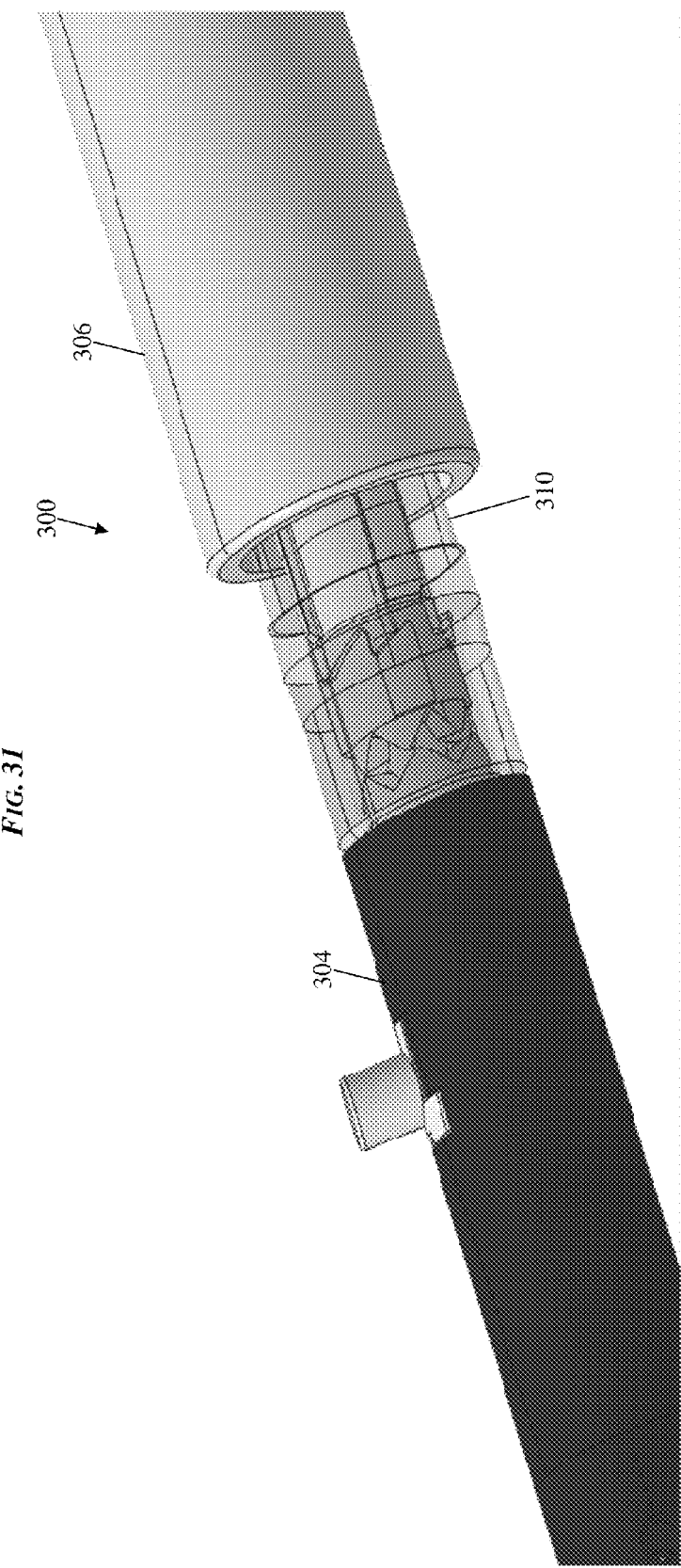
FIG. 31 is a partial cross-sectional perspective view of the stylus in an intermediate configuration subsequent to the intermediate configuration of FIG. 30.
Figure 32:
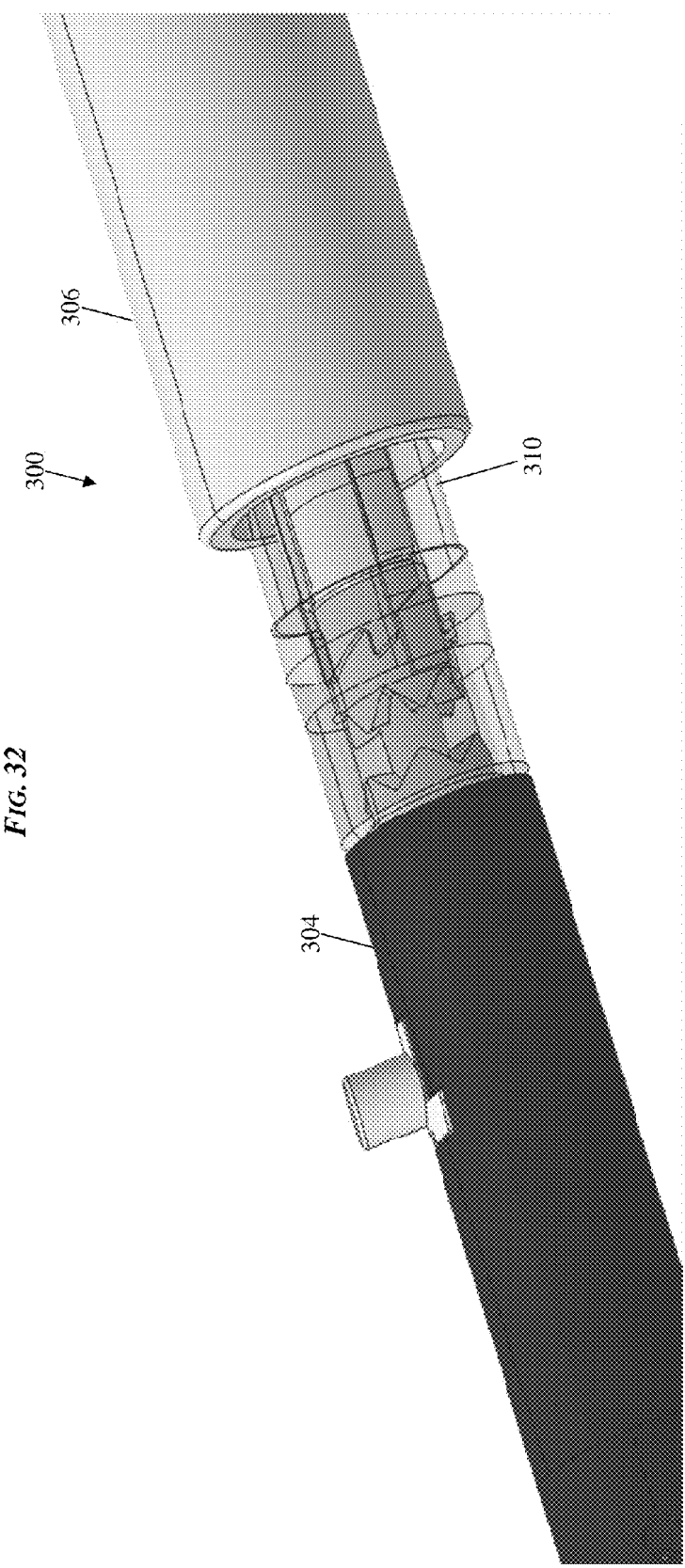
FIG. 32 is a partial cross-sectional perspective view of the stylus in an expanded configuration subsequent to the intermediate configuration of FIG. 31.

In general, pushing distally on the slider assembly 306 when the stylus 300 is in the unexpanded configuration, as shown in FIG. 26, can cause the second cam 308 to move longitudinally in a distal direction relative to the first cam 304, the cover 310, and the hardware assembly, as shown in FIG. 27. The distal cam surface 314 of the second cam 308 can move into contact with the proximal cam surface 316 of the first cam 304, as also shown in FIG. 27. The contact of the cam surfaces 314, 316 can cause the second cam 308 to rotate relative to the first cam 304, the cover 310, and the hardware assembly, as shown in FIG. 29. The rotation of the second cam 308 can rotate a proximal lock surface 318 of the second cam 308 into alignment with a second distal lock surface 322 of the cover 310 that is adjacent to the longitudinal groove 312. Then, when the distal pushing force is removed from the slider assembly 306, the second cam 308 can move longitudinally in a proximal direction relative to the first cam 304, the cover 310, and the hardware assembly, as shown in FIG. 30. The proximal lock surface 318 can move into contact with the second distal lock surface 322 of the cover 310. The abutment of the proximal and second distal lock surfaces 318, 322 can cause the second cam 308 to rotate relative to the first cam 304, the cover 310, and the hardware assembly, as shown in FIGS. 30 and 31, so as to allow the second cam 308 to move longitudinally and proximally within the longitudinal groove 312, as shown in FIG. 32. The stylus 300 can remain in the unexpanded configuration with the second cam 308 positioned within the longitudinal groove 312 until another distal pushing force is applied to the stylus's slider assembly 306.

Although the invention has been described by reference to specific embodiments, a person skilled in the art will understand that numerous changes may be made within the spirit and scope of the inventive concepts described. A person skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A device comprising:
    an electronic stylus including:
        a distal end configured to provide an electronic input to an electronic device;
        a first cam having a first cam surface, the first cam having an elongated member extending between a proximal end of the stylus and the distal end;
        a second cam configured to rotate relative to the first cam when the proximal end of the stylus is pushed in a distal direction, the pushing of the proximal end of the stylus causing a second cam surface of the second cam to contact the first cam surface and cause the rotation of the second cam relative to the first cam; and
        a cover having a first lock surface, the rotation of the second cam relative to the first cam causing a second lock surface of the second cam to abut the first lock surface so as to lock the second cam in a fixed position relative to the first cam.

2. The device of claim 1, wherein the pushing of the stylus in the distal direction causes the stylus to reduce in total longitudinal length.

3. The device of claim 1, wherein pushing the stylus in the distal direction when the second lock surface abuts the first lock surface causes the second lock surface to move a distance apart from the first lock surface and causes the second cam to rotate relative to the first cam.

4. The device of claim 3, wherein a total longitudinal length of the stylus is larger when the second lock surface is the distance apart from the first lock surface than when the second lock surface abuts the first lock surface.

5. The device of claim 1, wherein the first cam has an opening formed through a sidewall thereof; and
    the stylus includes a protrusion configured to move between a first position in which the protrusion is positioned within the opening and a second position in which the protrusion is not positioned within the opening, the pushing of the stylus causing the protrusion to move from the second position to the first position.

6. The device of claim 5, wherein pushing the stylus in the distal direction when the second lock surface abuts the first lock surface causes the protrusion to move from the first position to the second position.

7. The device of claim 1, wherein the pushing of the stylus in the distal direction causes the second cam to translate longitudinally within a passageway extending through the cover.

8. The device of claim 1, wherein the distal end of the stylus is configured to provide the electronic input by contacting at least one of a touch-sensitive surface of the electronic device and a light-sensitive surface of the electronic device.

9. A system, comprising:
   the electronic device of claim 1, the electronic device having a cavity formed therein; and
   the electronic stylus of claim 1 removably and replaceably disposed in the cavity.

10. The system of claim 9, wherein the stylus is configured to move between an unlocked configuration in which the stylus can be removed from the cavity and a locked configuration in which the stylus is locked within the cavity, the second lock surface abutting the first lock surface when the stylus is in the locked configuration and the second lock surface being spaced a distance apart from the first lock surface when the stylus is in the unlocked configuration.

11. A system comprising:
   a housing of an electronic device; and
   an electronic stylus removably and replaceably disposed in a cavity formed in the housing, the stylus having a proximal end, a distal tip, a first cam having a first surface and an elongated member extending between the proximal end and the distal tip, and a second cam configured to rotate relative to the first cam when the proximal end of the stylus is pushed in a distal direction, the distal tip of the stylus being configured to provide an electronic input to the electronic device, the stylus being movable between an expanded configuration in which the stylus can be removed from the cavity and an unexpanded configuration in which the stylus is locked within the cavity, the stylus in the cavity being movable from the unexpanded configuration to the expanded configuration by pushing the proximal end of the stylus relative to the housing in a distal direction to cause the second cam to move longitudinally away from the first cam, and the stylus in the cavity being movable from the expanded configuration to the unexpanded configuration by pushing the proximal end of the stylus relative to the housing in the distal direction to cause the second cam to move longitudinally in a distal direction relative to the first cam.

12. The system of claim 11, wherein the stylus has a first longitudinal length in the unexpanded configuration and a second longitudinal length in the expanded configuration that is greater than the first longitudinal length.

13. The system of claim 11, wherein the housing has a depression formed therein that is in communication with the cavity and the stylus has a protrusion extending therefrom that is disposed in the depression when the stylus is in the unexpanded configuration and that is not disposed in the depression when the stylus is in the expanded configuration.

14. The system of claim 13, wherein pushing on the stylus in the distal direction when the stylus is in the unexpanded configuration causes the protrusion to move out of the depression and pushing on the stylus in the distal direction when the stylus is in the expanded configuration causes the protrusion to move into the depression.

15. The system of claim 11, wherein when the stylus is in the unexpanded configuration, a first portion of the stylus is positioned entirely within the cavity and when the stylus is in the expanded configuration, part of the first portion of the stylus is positioned within the cavity and another part of first portion of the stylus is positioned outside the cavity.

16. The system of claim 11, wherein the stylus includes a detent element that biases the stylus to the expanded configuration.

17. The system of claim 16, wherein pushing on the stylus in the distal direction when the stylus is in the expanded configuration counteracts a bias provided by the detent element so as to move the stylus to the unexpanded configuration.

18. The system of claim 11, wherein the second cam rotates relative to the housing when the stylus is in the expanded configuration and is pushed in the distal direction so as to abut against a stop surface of the stylus and move the stylus to the unexpanded configuration.

* * * * *